(12) United States Patent
Eggers

(10) Patent No.: US 10,995,959 B2
(45) Date of Patent: May 4, 2021

(54) ISOTHERMAL COOKING PLATE APPARATUS, SYSTEM, AND METHOD OF MANUFACTURE AND USE

(71) Applicant: Eggers & Associates, LLC, Dublin, OH (US)

(72) Inventor: Philip E. Eggers, Dublin, OH (US)

(73) Assignee: Eggers & Associates, LLC, Dublin, OH (US)

( * ) Notice: Subject to any disclaimer, the term of this patent is extended or adjusted under 35 U.S.C. 154(b) by 119 days.

(21) Appl. No.: 16/044,774

(22) Filed: Jul. 25, 2018

(65) Prior Publication Data

US 2018/0328591 A1 Nov. 15, 2018

Related U.S. Application Data

(63) Continuation-in-part of application No. 14/526,570, filed on Oct. 29, 2014, now abandoned.

(51) Int. Cl.
| | |
|---|---|
| H05B 3/68 | (2006.01) |
| F24C 7/08 | (2006.01) |
| F24C 15/10 | (2006.01) |
| H05B 3/72 | (2006.01) |
| A47J 37/06 | (2006.01) |
| H05B 1/02 | (2006.01) |

(Continued)

(52) U.S. Cl.
CPC ........... *F24C 7/083* (2013.01); *A47J 37/0676* (2013.01); *F24C 15/105* (2013.01); *F24C 15/106* (2013.01); *H05B 1/0266* (2013.01); *H05B 3/12* (2013.01); *H05B 3/262* (2013.01); *H05B 3/72* (2013.01); *H05B 2203/003* (2013.01); *H05B 2203/013* (2013.01)

(58) Field of Classification Search
CPC ... A47J 37/0676; F24C 15/105; F24C 15/106; F24C 7/083; H05B 1/0266; H05B 2203/003; H05B 2203/013; H05B 3/12; H05B 3/262; H05B 3/72
USPC .......................................... 219/443.1–468.2
See application file for complete search history.

(56) References Cited

U.S. PATENT DOCUMENTS

| | | | | |
|---|---|---|---|---|
| 3,231,718 A | * | 1/1966 | Vasile | A47J 36/2483 219/450.1 |
| 3,569,672 A | * | 3/1971 | Hurko | H05B 3/72 219/465.1 |

(Continued)

*Primary Examiner* — Sang Y Paik
(74) *Attorney, Agent, or Firm* — Mueller Law, LLC; Jerry K. Mueller, Jr.

(57) ABSTRACT

An isothermal cooking plate assembly is formed from a first plate of high thermal conductivity material having a back surface and an oppositely disposed top cooking surface. One or more heater circuit assemblies are disposed on the first plate back surface for forming a composite having a back surface. A controller is in electrical connection with the heater circuit assemblies for controlling temperature of the first plate of high thermal conductivity material. The first plate can be aluminum Type 1100 or aluminum Type 6061. The first plate can be a laminate formed from a clad bottom metal layer and clad top cooking surface metal layer, where the clad layers formed from the same material and having about the same thickness. The clad material can be austenitic stainless steel. A second plate of low thermal conductivity material can be attached to the composite back surface of first plate.

18 Claims, 16 Drawing Sheets

(51) Int. Cl.
*H05B 3/12* (2006.01)
*H05B 3/26* (2006.01)

(56) References Cited

U.S. PATENT DOCUMENTS

| | | | | |
|---|---|---|---|---|
| 3,816,704 A | * | 6/1974 | Borom | H05B 3/688 |
| | | | | 219/465.1 |
| 3,934,119 A | * | 1/1976 | Trenkler | H05B 3/00 |
| | | | | 219/543 |
| 4,065,659 A | * | 12/1977 | Yount | A47J 37/0623 |
| | | | | 219/398 |
| 4,286,251 A | * | 8/1981 | Howell | H01C 17/0654 |
| | | | | 219/543 |
| 5,227,597 A | * | 7/1993 | Dickens | A47J 37/0676 |
| | | | | 219/621 |
| 5,354,509 A | * | 10/1994 | Kuo | B22F 1/0003 |
| | | | | 204/293 |
| 5,522,308 A | * | 6/1996 | Kayashima | A47J 37/0676 |
| | | | | 99/331 |
| 6,137,089 A | * | 10/2000 | Pragt | A47J 27/21041 |
| | | | | 219/436 |
| 6,262,399 B1 | * | 7/2001 | Lau | A47J 37/0676 |
| | | | | 219/450.1 |
| 7,227,104 B2 | * | 6/2007 | Ghislain | A47J 36/02 |
| | | | | 219/450.1 |
| 8,890,038 B2 | * | 11/2014 | Abbott | H05B 6/1272 |
| | | | | 219/466.1 |
| 2003/0024922 A1 | * | 2/2003 | Stanger | F24C 15/10 |
| | | | | 219/449.1 |
| 2004/0069767 A1 | * | 4/2004 | Haasis | A47J 37/0676 |
| | | | | 219/465.1 |
| 2013/0136920 A1 | * | 5/2013 | Tuffe | C23C 14/0664 |
| | | | | 428/336 |
| 2013/0340631 A1 | * | 12/2013 | Blixt | H05B 3/30 |
| | | | | 99/443 C |
| 2015/0014301 A1 | * | 1/2015 | Strehlow | H05B 3/26 |
| | | | | 219/540 |

\* cited by examiner

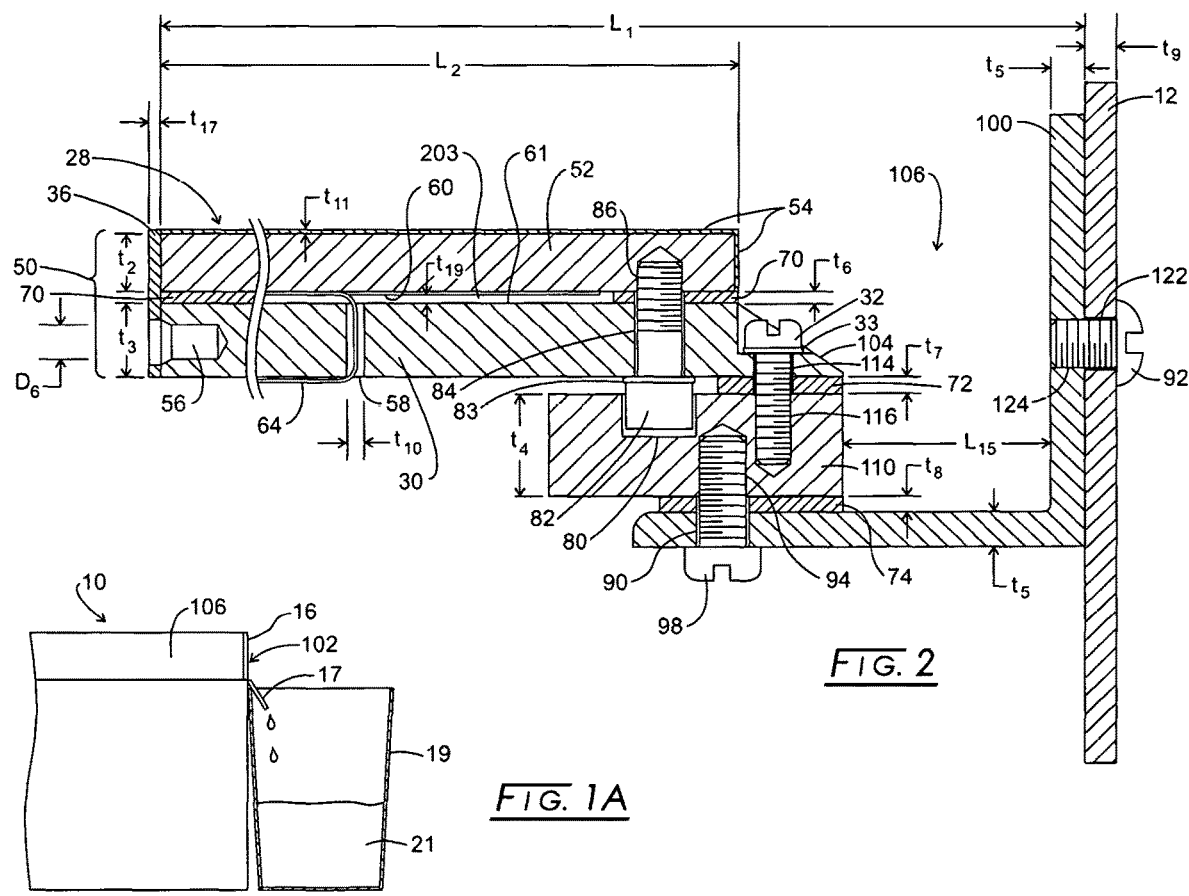

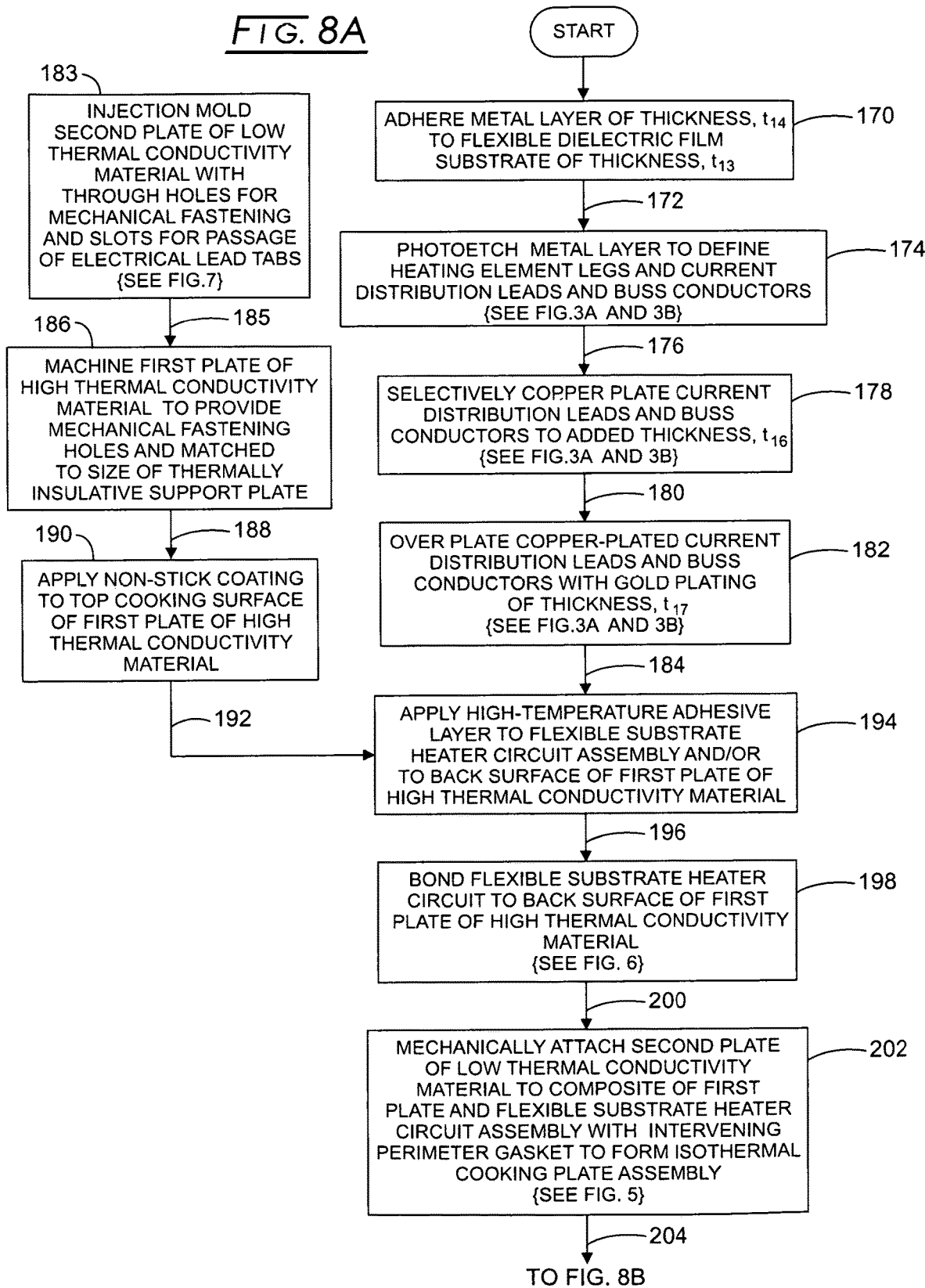

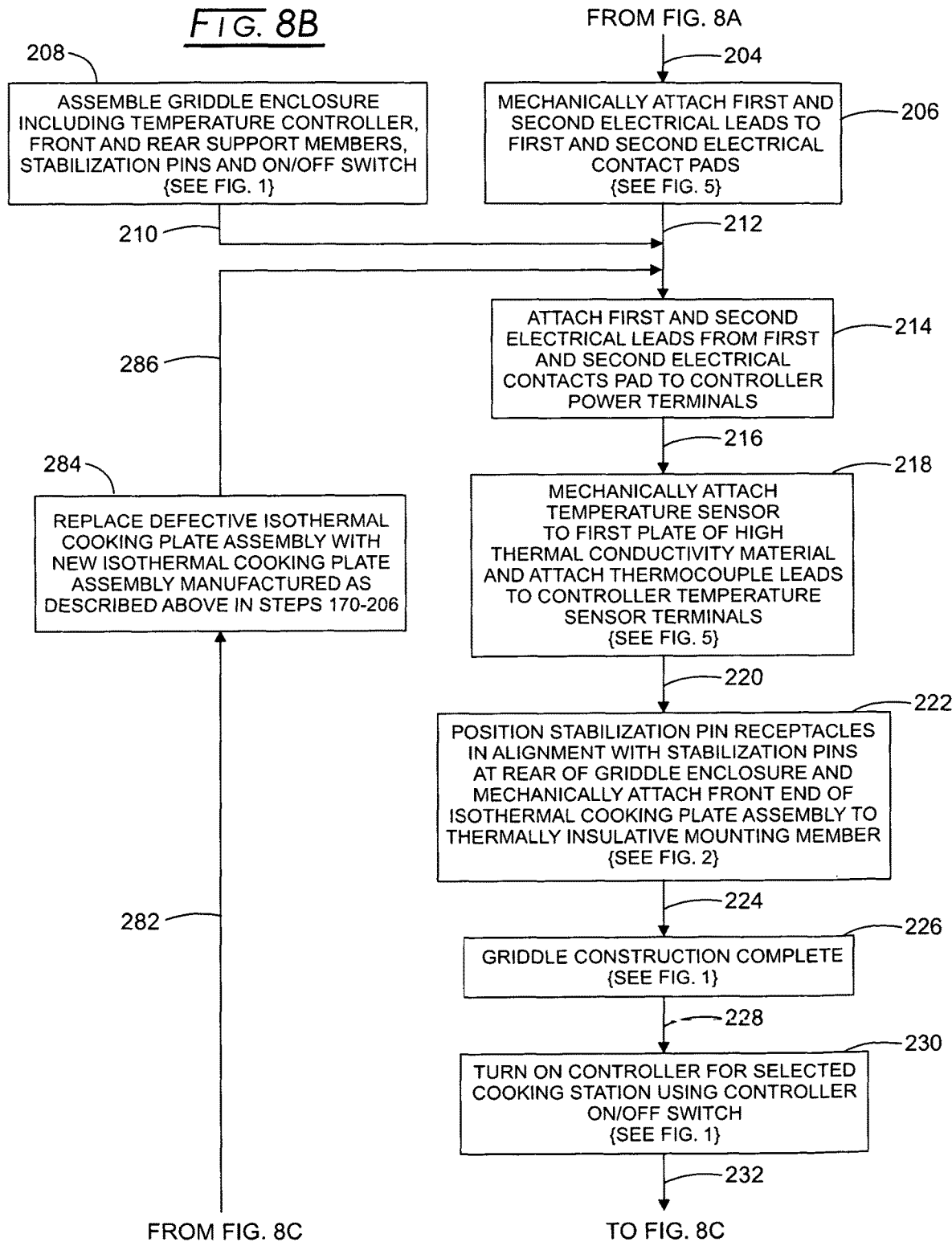

ISOTHERMAL COOKING PLATE APPARATUS, SYSTEM, AND METHOD OF MANUFACTURE AND USE

CROSS-REFERENCE TO RELATED APPLICATIONS

This application claims benefit of provisional application Ser. No. 61/899,415 filed on Nov. 4, 2013, and is a continuation-in-part of application Ser. No. 14/526,570 filed Oct. 29, 2014.

STATEMENT REGARDING FEDERALLY SPONSORED RESEARCH

Not applicable.

BACKGROUND

The accurate temperature control of cooking plate assemblies, also known as griddles, is required for certain food processing wherein variable rates of heat dissipation exist across the extent of the cooking surface. Some applications would benefit from improved energy efficiency if the cooking surfaces could be raised from room temperature to the desired operating temperature within a very brief time period so that the cooking plate (or griddle) is only heated during the time period that the cooking of food is required. Furthermore, some applications require that the cooking plate assembly be suitable and safe for contact with objects, such as liquid or solid foods, and be resistant to damage by exposure to liquids and mechanical damage by contacting objects such as knives and other cooking implements. In addition, there is a need to provide a cooking surface comprising a non-stick coating to minimize the need for supplemental cooking liquids (e.g., cooking oils) and minimize the effort required to clean adhered food residue from the cooking surface following prior cooking processes.

Accordingly, there is a need to provide a durable cooking plate capable of delivering and thermally conducting a sufficient amount of heat to maintain a substantially uniform or isothermal temperature distribution across the extent of the cooking plate surface while maintaining a pre-selected temperature in the presence of rapidly and widely varying heat dissipation rates across the surface of the cooking plate. The need for an isothermal cooking plate assembly capable of maintaining a substantially uniform temperature is a critical food safety requirement to ensure the adequate cooking of meat and poultry (e.g., steak, ground meat, ground poultry, hamburger patty, sausage patty) since cooking for a predetermined time interval (i.e., "cook by time") for a given type of food and food article is widely used in fast-food kitchens, food trucks (i.e., trucks that contain mobile kitchens to prepare food at multiple customer walk-up sites) and hotel/motel hospitality food services. In this regard, an operator that typically has limited professional cooking skills utilizes a settable elapsed time device (i.e., timer) to determine when the food article being cooked on the griddle is either ready to be cooked on opposite uncooked side or that the food article is adequately cook to ensure the safe consumption of the food. Limiting the maximum difference between the operator-selected temperature and any region of the cooking plate in contact with food to 10 C or less for the full range of cooking plate loading factors (i.e., fraction of cooking plate covered by food) and operator-selectable set-point temperatures up to 230 C (450 F) enables food to be cooked safely and consistently once the cooking duration parameter is initially confirmed through the simple measurement of the minimum internal temperature of the article of food using widely available meat thermometers. Once the required cooking duration is determined (using thermometry) that ensures that the minimum internal temperature of the food is cooked to an established safe temperature (e.g., 160 F or 71 C for the case of hamburger), then that determined cooking duration (e.g., 500 seconds) can be used in subsequent cooking of the same type and size of food article as long as the food cooking plate is known to be substantially equal to the operator selected set point (i.e., within 10 C or less of the operator selected set-point temperature).

A griddle system that incorporates an isothermal cooking plate assembly requiring only a brief period to heat up the first plate cooking surface from room temperature to an operator-selected set-point temperature, preferably within 30 seconds, is also needed since many applications involve "on demand" cooking of food, i.e., cooking of food when an individual order is received such as cooking food on a food truck or in the kitchen of a hotel/motel hospitality breakfast service. The ability to heat up the first plate of an isothermal cooking plate assembly of a griddle system within 30 seconds results in a significant savings of power and reduces environmental cooling requirements since the isothermal cooking plate assembly is heated to a cooking temperature (e.g., 150 C) for only the period of time during which the cooking of one or more articles of food is actually being performed. As a result, the ability to heat up the first plate of an isothermal cooking plate assembly of a griddle system within 30 seconds provides: [a] a reduction in the operator's food preparation time for a given food cooking request, [b] an increase in the number of customers that can be served per unit time (e.g., customers served per hour) and [c] a reduction in the cost for energy required for cooking food since electrical power is only being supplied to the isothermal cooking plate assembly of the griddle system at the time a request for cooked food is received (e.g., an food order is received for a cooked hamburger).

A griddle system that incorporates an isothermal cooking plate assembly requiring a source of electrical power having a voltage of only 115 volts at a maximum current of 20 amps is also needed since it would be useful in many settings such as hospitality food service kitchens of hotels and motels as well as food trucks and "mom and pop" short order kitchens that prepare food on demand (i.e., as orders are received). This capability eliminates the need for a special high-voltage 220 volt service installation that requires specially wiring within the walls or a custom external conduit to extends to a special high-voltage outlet and a special addition to the utility box to accommodate each dedicated 220 volt outlet.

In addition, there is a need to simplify the complexity of the cooking plate construction to increase its reliability and reduce its manufacturing costs to enable its use in high-volume cooking applications and enable rapid and convenient replacement of only the cooking plate assembly in the event of deterioration and loss of release characteristics of the non-stick coating, failure of the resistive heating element and/or failure of temperature sensor without the need for replacing the cooking plate support structure, partial enclosure or temperature control electronics comprising the controller, temperature sensor, and power leads to the resistive heating element.

An example embodiment of the present disclosure is a griddle system incorporating two independently controlled isothermal cooking plate assemblies. It is estimated that the total manufacturing cost for a griddle system having two independently controllable cooking stations is less than $1,000. At this manufacturing cost level, the finished product could be sold at a price level that could be accommodated by a wide range of food service operators including hospitality food service kitchens of hotels and motels as well as food trucks and "mom and pop" short order kitchens that prepare food on demand. In addition, the estimated cost for each independently controllable and readily replaceable isothermal cooking plate assembly is less than $200.

BRIEF SUMMARY

The present disclosure is addressed to design for a griddle system comprising an isothermal cooking plate assembly, controller, griddle enclosure and method of manufacture of the isothermal cooking plate assembly. As described more fully below, the present disclosure specifies the optimum design for a building-block type griddle system wherein independently controlled isothermal cooking plate assemblies are optimized for [a] a maximum temperature difference between the operator-selected set-point temperature and any temperature within cooking plate in contact with food that does not exceed the set-point temperature by more than 10 C for all set-point temperatures, [b] a rapid heat-up from room temperature to the operator-selected set-point temperature of less than 30 seconds, [c] convenient use of readily available line power at a maximum current of 20 amps at 115 volts (i.e., standard capacity of most electrical outlets) and [d] convenient replacement of a low-cost isothermal cooking plate assembly in the field (e.g., replacement due to degradation over time of the non-stick coating or failure of the heating element) while reusing the griddle controller and support structure. The isothermal cooking plate assembly includes a first plate of high thermal conductivity material that advantageously may be aluminum Type 1100 or Type 6061. The preferred material for first plate 52 is aluminum Type 1100 owing to its higher thermal conductivity of 2.18 watts/cm-C as compared aluminum Type 6061 having a thermal conductivity of 1.67 watts/cm-C. The first plate has a substantially uniform thickness over the full extent of its surface used for cooking.

As used herein, the term "substantially uniform thickness" refers to the standard thickness tolerance for commercially available materials in the form of sheets. By way of example, Aluminum 1100 sheet stock is available from McMaster Carr (Cleveland, Ohio) in sheet sizes up to 48 inch×96 inch having a thickness of 0.190 inch and a thickness tolerance of +/−0.011 inch. At a sheet thickness of 0.250 inch, Aluminum 1100 sheet stock is available from McMaster Carr (Cleveland, Ohio) in sheet sizes up to 48 inch×96 inch having a thickness tolerance of +/−0.016 inch.

Based on the detailed heat transfer analyses performed as well as the calculation of heat up rates of alternative first plates of isothermal cooking plate assemblies, the commercially available thickness tolerances are sufficiently small that the computed temperature distributions of the first plate as well as the calculated rates of heat-up to the set-point temperature (e.g., 150 C) are effectively unchanged. For example, for an Aluminum 1100 first plate having a length of 7.9 inch and a width of 6.3 inch, the time required to heat up from 25 C to 150 C at a specified thickness of 0.187 inch and maximum power input of 115 volts at 20 amps (i.e., 2300 watts) is 20.8 seconds. If the Aluminum 1100 sheet having a nominal thickness of 0.187 inch is manufactured at the maximum commercially available thickness based on a thickness tolerance of +/−0.011 inch, then the heat up time for the maximum manufactured sheet thickness of 0.187 inch+0.011 inch or 0.198 inch is 22.0 seconds or 1.2 seconds longer than the heat up time for the first plate having a nominal sheet thickness of 0.187 inch.

The uniformly thick first plate of high thermal conductivity material may optionally be roll bonded on either side with a cladding layer, for instance, formed of equal-thickness austenitic stainless steel, such as a type 304. Thus, a clad version of first plate of high thermal conductivity material is symmetrical and, notwithstanding, differences of thermal coefficients of expansion, the laminar component will not warp, for example, during intended operation at elevated temperatures. The corrosion-resistant and durable cladding (e.g., austenitic stainless steel) may be applied by roll bonding, plasma spray coating or vapor deposition processes. In addition, the hardness, wear resistance, corrosion resistance, and lubricity of the exterior surface of the stainless steel cladding may be further improved using metal finishing processes such as MEDCOAT 2000™ provided by the Electrolyzing Corporation of Ohio (Cleveland, Ohio). Alternatively, the cooking surface of the first plate of high thermal conductivity material may coated with a corrosion resistant and durable surface layer applied by electroplating or electroless plating processes (e.g., nickel or chrome plated surface coating).

A non-stick coating may be advantageously disposed on and in good thermal communication with the top cooking surface of the first plate of high thermal conductivity material of the present disclosure to minimize the need for supplemental cooking liquids (e.g., cooking oils) and to minimize the effort required to clean adhered food residue from the top cooking surface following prior cooking processes.

Thermal energy is supplied to the first plate on the side opposite its food cooking surface by a flexible substrate heater circuit assembly incorporating one or more resistor heating segments having associated circuit leads extending to an array of resistive heating element terminals located on the side opposite its food heating side. Two manufacturing methods for the flexible substrate heater circuit assembly are described. In the first manufacturing method, the heater circuit and lead circuit is entirely contained on one surface of a polyimide or other suitable flexible plastic substrate wherein the heater circuit is accessed by exposed contact tab terminals located on the polyimide substrate that extend from the first plate of high thermal conductivity material. The metallic heater circuit portions of the flexible circuits are applied to the back surface of the first plate opposite top cooking surface using a thermally conductive, electrically insulative adhesive.

In the second heater manufacturing method involving a first plate of thermally conductive material that is metallic, a first electrically insulative layer is screen printed and cured or fired on the back surface of the first plate opposite its top cooking surface followed by the selective screen printing and curing or firing of [a] a second electrically resistive heating element layer (utilizing screen printable inks of higher electrical resistivity) on the first electrically insulative layer and [b] a third electrically conductive lead and contact pad pattern layer (utilizing screen printable inks of lower electrical resistivity) in electrical communication with the heating element. Alternatively, in the second heater manufacturing method involving a first plate of thermally conductive material that is electrically insulative (e.g., aluminum nitride), a first electrically resistive layer is screen printed and cured or fired on the back surface of the first plate opposite its top cooking surface followed by the screen printing and curing or firing of [a] a second electrically conductive lead and contact pad pattern (utilizing screen printable inks of lower electrical resistivity) in electrical communication with the heating element.

The thickness of the first plate of high thermal conductivity material of the isothermal cooking plate assembly is optimized to [a] provide the thermal conductance required to maintain a substantially uniform temperature across the entire surface of the first plate in the presence of varying heat dissipation rates across the entire surface of the first plate while [b] minimizing the time required to heat up the first plate of the isothermal cooking plate assembly to the user-selected set-point temperature. In both manufacturing approaches, the thermal conductance between the resistive heating element and the first plate is selected to be sufficiently high to enable the first plate to be heated to the selected set-point temperature within several tens of seconds. By way of example, the first plate of the present disclosure can be heated from room temperature to 150 C within less than 30 seconds for resistive heating elements energized with a maximum applied alternating current of 20 amps at an applied line voltage of 115 volts.

The operating temperature of the first plate of the isothermal cooking plate assembly of the present disclosure may be fixed or may be operator selectable and controlled with a temperature-feedback control system design. The temperature feedback control system design utilizes a temperature sensor (e.g., thermocouple) that is in thermal communication with the first plate to regulate the application of power to a heater circuit assembly to maintain the first plate at the operator selected set-point (i.e., cooking) temperature. This controller design is referred to hereinafter as temperature-sensor based feedback control.

By way of example, one or more Constantan-on-polyimide flexible heater circuit assemblies can be thermally attached to the first plate on the side opposite its food cooking surface using the aforementioned high thermal conductance and electrically insulative adhesive layer. Constantan is a copper-nickel alloy, usually consisting of 55% copper and 45% nickel. By measuring the first plate temperature using a temperature sensor (e.g., thermocouple), the power delivered to the heater circuit assembly can be controlled by a controller to maintain the first plate at the user-selected set-point temperature.

As an alternative to the Constantan-on-polyimide resistive heating element design described above, thick film printing processes may be used to first print a thermally conductive, electrically insulative layer on the first surface of the first plate. Following curing of this dielectric layer, the resistive heating element heater traces and lead pattern is screen printed on the dielectric layer using electrically conductive thick film ink and cured. By way of example, high thermal expansion glass-based dielectric layer and heater/lead thick-film printable materials may be used that match the thermal expansion of the first plate of high thermal conductivity material. In this regard, see U.S. Pat. No. 5,308,311, entitled Electrically Heated Surgical Blade and Method of Making. In yet another alternative method of manufacturing the resistive heating element, a polymer-based dielectric layer and polymer-based resistive heating element heater traces and lead pattern may be screen printed directly on the first plate of high thermal conductivity material.

The incorporation a first plate of high thermal conductivity material (e.g., aluminum Type 1100) provides heat conduction throughout the extent of the plane of the first plate so that regions of higher heat dissipation in contact with food and required for cooking receive thermal power [a] by heat conduction across the thickness of the first plate from the resistive heating element positioned directly opposite the region of higher heat dissipation and [b] by lateral heat conduction within in the plane of the first plate of high thermal conductivity material from the resistive heating elements located in the regions surrounding the region of higher heat dissipation.

The side of the first plate of high thermal conductivity material (i.e., thermally conductive material) opposite the top cooking surface and containing the flexible substrate heater circuit assembly may be covered with a thermal insulation layer to reduce unwanted heat loss from the side of the first plate that is opposite the top cooking surface. By way of example, a rigid second plate of low thermal conductivity material covers the entire surface of the first plate of high thermal conductivity material on the side opposite the top cooking surface. The second plate of low thermal conductivity material (i.e., thermally insulative material) may be selected from the family of plastic materials including, for example, polyphenylene sulfide, polyamide-imide, polyetherimide, and polyetheretherkeytone offering low thermal conductivity, durability, and capability to withstand continuous operation at temperatures of 200 C or greater. An air gap is introduced between the back side of the thermally conductive first plate on which the heater circuit assembly is disposed and the front side of the thermally insulative second plate in order to reduce heat losses from the back side of the first plate. By way of example, the thermally insulative second plate may be attached to the first plate using an intervening high-temperature gasket material around the perimeter (e.g., silicone gasket) to effect a small air gap (e.g., 0.1 to 0.2 inch) between the plates, thereby providing high thermal impedance and low heat loss from the heater side of the first plate due to the very low thermal conductivity of air. Alternatively, the front side of the thermally insulative second plate may be positioned opposite the back side of the thermally conductive first plate on which the heater circuit assembly is disposed with an air gap while not mechanically attached to the first plate.

Further disclosed is an example method for manufacturing an isothermal cooking plate assembly having first plate portion, heater portion and second plate that functions as both a thermal insulation covering over the back side (i.e., side opposite the cooking surface of first plate) of first plate as well as a support for first plate. The method of manufacture includes the steps:

providing first plate of high thermal conductivity material;

providing a flexible substrate heater circuit assembly;

bonding the flexible substrate heater circuit assembly to the side of first plate opposite the top cooking surface [a] using an electrically insulative and thermally conductive adhesive, if the resistive heating element side is bonded directly to the first plate; or [b] using a thermally conductive adhesive, if the electrically insulative side of flexible substrate heater circuit assembly is bonded directly to the first plate;

mechanically attaching composite of thermally conductive first plate and flexible heater circuit assembly to a thermally insulative second plate to form an isothermal cooking plate assembly; and assembling isothermal cooking plate assembly within griddle enclosure containing controller and attaching temperature sensor and heater circuit assembly power leads to controller.

The disclosure, accordingly, comprises the apparatus, method, and system possessing the construction, combination of elements, arrangement of parts and steps, which are exemplified in the following detailed description.

BRIEF DESCRIPTION OF THE DRAWINGS

For a fuller understanding of the nature and advantages of the present method and process, reference should be made to the following detailed description taken in connection with the accompanying drawings, in which:

FIG. 1A is a pictorial representation of receptacle for collection of excess oil/fat and cooking debris discharged at right side of griddle system;

FIG. 2 is a detailed sectional view of the isothermal cooking plate assembly comprising first plate of high thermal conductivity material, flexible substrate heater circuit assembly and second plate of low thermal conductivity material illustrating mechanical attachment between first and second plate, front support and rear support pin receiving holes;

FIG. 3A top view of the first type and second type resistive heating elements, leads and electrical contact tabs at either end of heater/lead pattern;

FIGS. 8A-8C combine as labeled thereon to provide a flow chart describing the manufacture and use of isothermal cooking plate assembly as at FIGS. 1, 2, 5, and 6;

Figure 1:
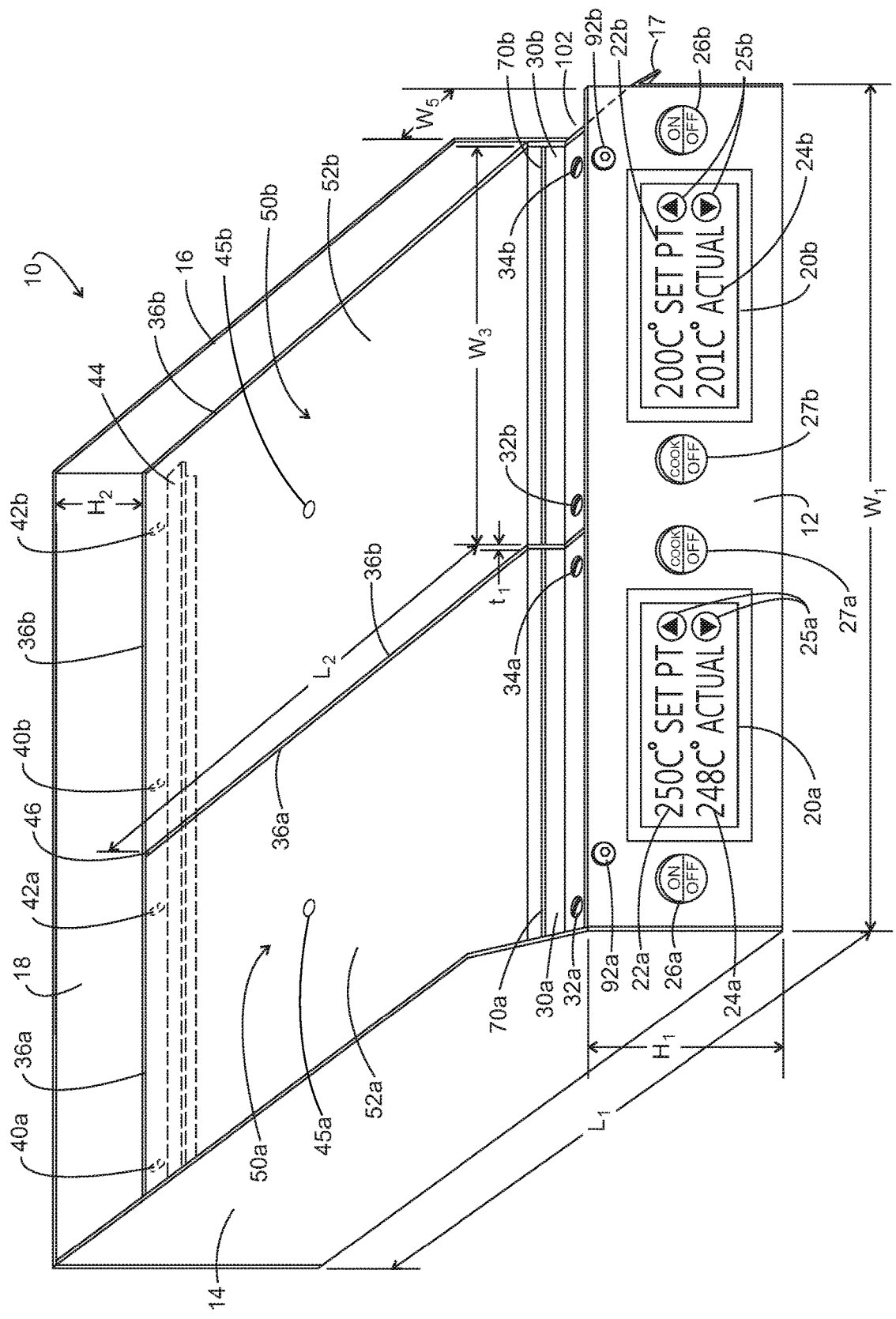
FIG. 1 is a pictorial representation of a two-station griddle comprising two isothermal cooking plate assembly assemblies.

The drawings will be described in greater detail below.

DETAILED DESCRIPTION

In the disclosure to follow, initially described is an isothermal cooking plate assembly incorporating a thermally conductive aluminum first plate having a uniform thickness, which is covered by and in good thermal communication with a durable non-stick coating on the cooking-surface side. The thermally conductive cooking plate is heated by electrically resistive circuit elements mounted upon a flexible substrate. Preferably, the resistive heating element components and the leads extending thereto as well as the electrical contact tabs are provided on one singular surface of a supporting flexible substrate. This flexible circuit is bonded to the first plate with a thermally conductive, electrically insulative adhesive in the case in which the metallic resistive heating element side of the flexible circuit is adhesively bonded directly to the first plate. Alternatively, this flexible circuit is bonded to first plate with a thermally conductive adhesive (which may or may not be electrically insulative) in the case in which the electrically insulative polyimide substrate side of the flexible circuit is adhesively bonded directly to the first plate. By way of example, the use of a higher thermal conductivity, electrically insulative substrate such as Kapton MT (available from DuPont, Wilmington, Del.), having a thermal conductivity of 0.0046 watts/cm-C, enables the use of high thermal conductivity, metal or graphite powder-filled adhesives to attach the flexible polyimide substrate to first plate on the side opposite the cooking side.

Heat transfer analyses and heat-up rate analyses are performed on alternative first plate designs to determine the range of first plate dimensions that achieve the primary objectives of [a] an isothermal cooking plate assembly in which the temperature of the one or more regions or zones of the first plate in contact with the food being cooked remain substantially equivalent to the operator-selected set-point temperature (e.g., 150 C) and [b] an isothermal cooking plate assembly in which the first plate heats up from room temperature (e.g., 25 C) to the operator-selected set-point temperature (e.g., 150 C) within a brief period of time (e.g., a period not exceeding 30 seconds). For the sake of clarity, it should be emphasized that computer program based heat transfer analyses confirm that regions of the first plate not in contact with food can rise more than 10 C above the set-point temperature, since they are only in contact with air. However, their operation beyond "isothermal" conditions specified herein (i.e., within 10 C of the set-point temperature) are of no consequence, since only regions of the first plate in contact with food affect the intended cooking of the food whose rate depends on the temperature of the first plate subregions in contact with the one or more articles of food. The disclosure now turns to the manufacturing techniques employed for the preferred embodiment.

Referring to FIG. 1, a two-station griddle system of the disclosure is represented in general at 10. Griddle system 10 includes isothermal cooking plate assemblies 50a, 50b at first and second cooking stations, respectively, comprising first plates 52*a*, 52*b* of high thermal conductivity material surmounted on second plates 30*a*, 30*b* of low thermal conductivity material, respectively. The front panel 12, left side panel 14, right side panel 16, and rear panel 18 of enclosure for griddle system 10 may be manufactured using 0.036"-thick austenitic stainless steel Type 304 sheet material available from McMaster-Carr Supply Company (Cleveland, Ohio). A flexible substrate heater circuit assembly 130 (see FIG. 3A) is in thermal communication with and attached to the side opposite of the first plate surfaces (not shown in FIG. 1).

Still referring to FIG. 1, controllers 20*a*, 20*b* corresponding to the two stations of the griddle system 10 include set-point up/down selector buttons 25*a*, 25*b* as well as set-point displays 22*a*, 22*b* and actual first plate temperature displays 24*a*, 24*b*. By way of example, a controller 20 for controlling temperature of first plate 52 is available from Omega Engineering, Inc. Model No. CNi8DH (Stamford, Conn.). Controller 20 for controlling temperature of first plate 52 includes solid-state relay to control power applied to flexible substrate heater circuit assembly 130 (not shown). By way of example, a preferred solid-state relay with integral heat sink is Crydon Model No. HS251-D2450 available from Wolf Automation, Inc. (Algonquin, Ill.). Temperature feedback control is provided to controller 20 for controlling temperature of first plate 52 by temperature sensor 38 mechanically attached to first plate seen in FIG. 5. By way of example, temperature sensor 38 may be a CHROMEL®-ALUMEL® (registered trademarks of Hoskins Alloys, L.L.C., Farmington Hills, Mich.) washer-type thermocouple available from Omega Engineering, Inc. (Stamford, Conn.). Also, as seen in FIG. 1, the front panel of griddle system 10 includes controller on/off controls 26*a*, 26*b* and on/off power switch for griddle heaters 27*a*, 27*b*.

As seen in FIG. 1, rear support 44 is shown in phantom view along with first stabilization pins 40*a*, 40*b* and second stabilization pins 42*a*, 42*b* machined from austenitic stainless steel Type 304 rod stock with threaded proximal end for mechanical attachment to rear panel 18 of griddle system 10. Rear support 44 may be an austenitic stainless steel Type 304 90-degree angle available from McMaster-Carr Supply Company (Cleveland, Ohio). First and second isothermal cooking plate assembly 50*a* mechanical fastening screws 40*a*, 42*a* are seen at front end of first plate incorporated in first cooking station of griddle system 10. Also, as seen in FIG. 1, first and second isothermal cooking plate assembly 50*b* mechanical fastening screws 40*b*, 42*b* are seen at front end of first plate incorporated in second cooking station of griddle system 10. All mechanical fastening screws identified throughout this specification are preferably fabricated from austenitic stainless steel Type 316 and available from McMaster-Carr Supply Company (Cleveland, Ohio).

Referring to FIGS. 1 and 2, mechanical fastening screws 92*a*, 92*b* of diameter D2 are seen at front panel 12 of griddle system that pass through holes 122 of diameter D10 and into threaded holes 124 mechanically secure front support member 100 to front panel 12. Also, excess liquid and cooking debris discharge opening 102 in the right side panel 16 is shown in FIG. 1 at right end of discharge trough 106 (seen in FIG. 2). A portion of the right side panel 16 is cut and folded down forms ramp 17 that enables the flow of excess oil/fat and cooking debris 21 through excess liquid and cooking debris discharge opening 102 into receptacle 19 as seen in FIG. 1A.

Referring to FIGS. 1 and 2, gap 46 is seen between first-station first plate 52*a* of high thermal conductivity material and second-station first plate 52*b* of high thermal conductivity material of high thermal conductivity material is filled with strip of resilient, closed-cell silicone foam in the form of a liquid-tight sealing strip 36*a*, 36*b*. Still referring to FIGS. 1 and 2, a strip of resilient, closed-cell silicone foam in the form of a liquid-tight sealing strip 36*a*, 36*b* continues around the perimeter of first plate 52*a*, 52*b* of high thermal conductivity materials and adjacent second plates 30*a*, 30*b* of low thermal conductivity materials to form a liquid-tight seal at the interface between the isothermal cooking plate assembly 50 and the left side panel 14, right side panel 16 and rear panel 18. By way of example, all silicone sealing strips and gaskets referenced throughout this specification may be procured from Stockwell Elastomerics Corporation (Philadelphia, Pa.). Gap 46 provides for the thermal isolation of first-station first plate 52*a* of high thermal conductivity material and second-station first plate, 52*b* of high thermal conductivity material so that the first- and second-station first plates can be optionally operated at different set-point temperatures.

Referring now to FIG. 2, the mechanical attachments between the first plate 52 of high thermal conductivity material, second plate 30 of low thermal conductivity material, thermally insulative mounting support 110 and front support member 100 are shown in greater detail.

First plate 52 of high thermal conductivity material may be machined from Type 1100 aluminum plate or Type 6061 aluminum plate, both available from McMaster-Carr Supply Company (Cleveland, Ohio). Second plate 30 of low thermal conductivity material may be injection molded from a plastic material with a high service temperature of at least 150 C. By way of example, second plate 30 of low thermal conductivity material may be injection molded from [a] RYTON® polyphenylene sulfide resin available from Chevron-Phillips Chemical Company (Woodlands, Tex.) or [b] ULTEM® 1000 polyetherimide resin available from Sabic Corporation (Pittsfield, Mass.). By way of example, thermally insulative mounting support member 110 may be machined from DELRIN® (registered trademark of E.I. du Pont de Nemours and Company, Wilmington, Del.) acetal resin bar stock available from McMaster-Carr Supply Company (Cleveland, Ohio).

The uniformly thick first plate 52 of high thermal conductivity material may optionally be roll bonded on either side with a cladding layer (not shown in figures), for instance, formed of equal-thickness austenitic stainless steel, such as a type 304. The preferred thickness of the cladding layer is in the range 0.002 to 0.010 inch, more preferably 0.002 inch to 0.004 inch. A small cladding thickness is preferred to minimize the effect of the added volume of cladding material on the time to heat up the first plate 52 of isothermal cooking plate assembly 50 from room temperature to the operator-selected set-point temperature.

In a preferred embodiment seen in FIG. 2, the exposed top cooking surface and front edge surface of first plate 52 of high thermal conductivity material are covered with a non-stick coating 54. By way of example, non-stick coating may be selected from polytetrafluoroethylene (PTFE) type coatings such as XYLAN® 8110 supplied by Whitford Corporation (Elverson, Pa.). Such non-stick coatings may be deposited in the form of a powder or liquid using a spray application method having a continuous thickness of about 0.0005 to 0.005 inch. The non-stick coating and the first plate are then heated to an elevated temperature (e.g., 200 C to 350 C) to provide an adherent bond between the non-stick coating and the cooking surface of the first plate. Alternatively, ceramic, PTFE-free non-stick coatings are available from Thermalon Korea Company, Ltd. In the U.S., THERMALON® (registered trademark of FIPA GmbH Gellschaft mit beschränkter Haftung Fed Rep Germany, Ismanoing, Germany) coating Sol Gel 101 is available from Porcelain Industries (Dickson, Tenn.).

Figure 5:
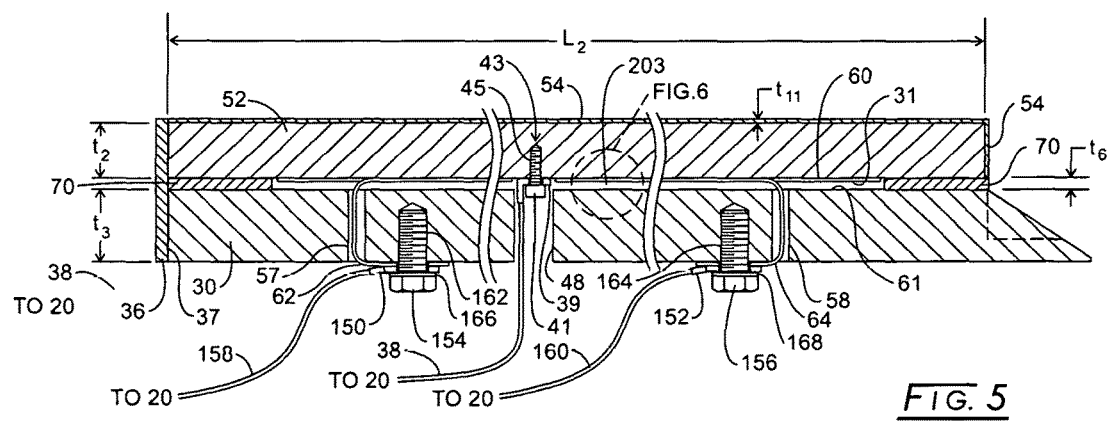
FIG. 5 is a detailed sectional view of portions of isothermal cooking plate assembly showing mechanical lead attachment and temperature sensor location.

The arrangement of mechanical fastening attachments seen in FIG. 2 provides for the convenient removal of isothermal cooking plate assembly 50 in the field where the griddle system 10 is being used in the event of [a] degradation of the non-stick coating 54, [b] electrical failure of resistive heating element/dielectric substrate flexible substrate heater circuit assembly 130 and/or [c] electrical failure of temperature sensor 39 (seen in FIG. 5).

As seen in FIG. 2, first plate 52 of high thermal conductivity material is mechanically attached to second plate 30 of low thermal conductivity material with mechanical fastening screw 82 of diameter D3 that passes through hole 84 of diameter D11 in second plate 30 of low thermal conductivity material and into threaded hole 86 in first plate 52 of high thermal conductivity material at a minimum of four locations, preferably at a minimum of at least six locations. The diameter of hole 84 in second plate 30 of low thermal conductivity material is enlarged to accommodate the thermal expansion difference between first plate 52 of high thermal conductivity material operating at elevated set-point temperature selected for cooking purposes and lower temperature of second plate 30 of low thermal conductivity material. Also, as seen in FIG. 2, low-friction washer (e.g., polytetrafluoroethylene) 83 is positioned between head of mechanical fastening screw 82 and surface of second plate 30 of low thermal conductivity material to enable sliding of mechanical fastening screw 82 relative to second plate 30 of low thermal conductivity material as a result of differential thermal expansion induced forces. By way of example, low-friction polytetrafluoroethylene washers are available from Boker's, Inc. (Minneapolis, Minn.).

A high-temperature gasket 70 (e.g., silicone rubber) is positioned around the perimeter of the interface between the first plate 52 of high thermal conductivity material and the second plate 30 of low thermal conductivity material. A counter bore hole 80 is machined in thermally insulative mounting support member 110 to accommodate head of mechanical fastening screw 82 whose location is offset (to prevent mechanical interference) from the location of mechanical fastening screw 98 of diameter D5. Thermally insulative mounting support member 110 is securely attached to front support member 100 with mechanical fastening screw 98 that extends through hole 90 of diameter D13 in front support member 100 and into threaded hole 94 in thermally insulative mounting support member 110.

A slot 58 in the second plate 30 of low thermal conductivity material provides for the passage of the electrical contact tab 64 from the flexible substrate heater circuit assembly 130 to a mechanical attachment with the second electrical lead wire 160 (seen in FIG. 5) originating at controller 20b. Mechanical fastening screw 98 secures thermally insulative mounting support 110 to front support member 100. As seen in FIG. 2, liquid-tight barrier strip 74 is located between the base of thermally insulative mounting support 110 and the top surface of front support member 100 to prevent the ingress of liquids into the interior of the griddle system 10. By way of example, liquid-tight barrier strip 74 may be formed from silicone sheet material available from Stockwell Elastomerics Corporation (Philadelphia, Pa.).

Referring to FIG. 2, receiving hole 56 of diameter D6 is seen at back end of second plate 30 of low thermal conductivity material for engagement with stabilization pin 40 or 42. The combination of the insertion of these stabilization pins 40, 42 into receiving holes 56 at the rear of second plate 30 of low thermal conductivity material and the engagement of mechanical fastening screw 32 of diameter D4 at the front end of second plate 30 of low thermal conductivity material provide for the removable attachment of the isothermal cooking plate assembly to the griddle system 10. A seen in FIG. 2, mechanical fastening screw 32 passes through hole 114 of diameter D12 in second plate 30 of low thermal conductivity material and into threaded hole 116 in thermally insulative mounting support 110. The diameter of hole 114 in second plate 30 of low thermal conductivity material is enlarged to accommodate the thermal expansion difference between second plate 30 of low thermal conductivity material operating at an elevated temperature and the lower temperature of thermally insulative mounting support 110. Also, as seen in FIG. 2, low-friction washer (e.g., polytetrafluorethylene) 33 is positioned between head of mechanical fastening screw 32 and surface of thermally insulative mounting support 110 to enable sliding of mechanical fastening screw 32 relative to thermally insulative mounting support 110 as a result of differential thermal expansion induced forces. By way of example, low-friction polytetrafluoroethylene washers are available from Boker's, Inc. (Minneapolis, Minn.).

As seen in FIG. 2, liquid-tight barrier strip 72 is located between the base of second plate 30 of low thermal conductivity material and the top surface of thermally insulative mounting support 110 to prevent the ingress of liquids into the interior of the griddle system 10. Also, liquid tight sealing strip 36 is seen at back edge of isothermal cooking plate assembly 50 to prevent ingress of liquids into interior of griddle system. By way or example, liquid-tight barrier strips 36 and 72 may be formed from silicone sheet material available from Stockwell Elastomerics Corporation (Philadelphia, Pa.).

Figure 3A:
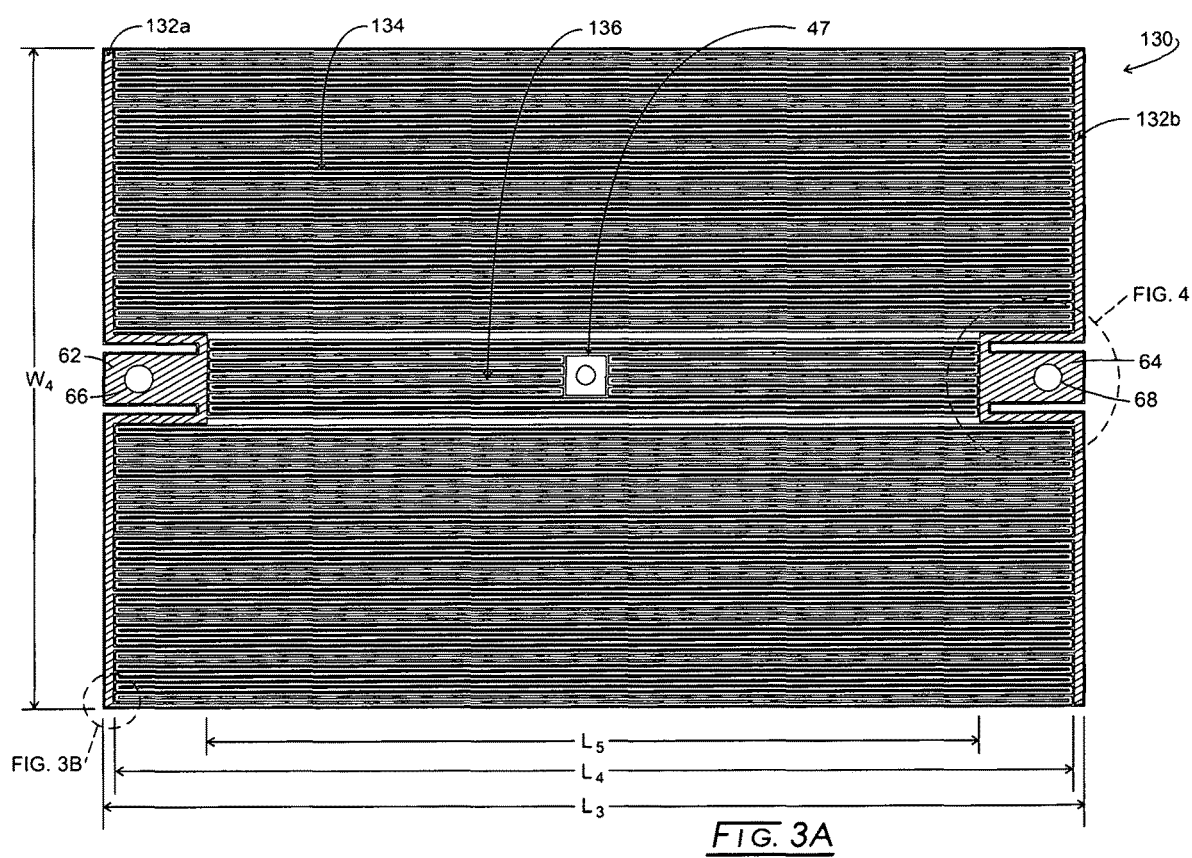
Figure 3B:
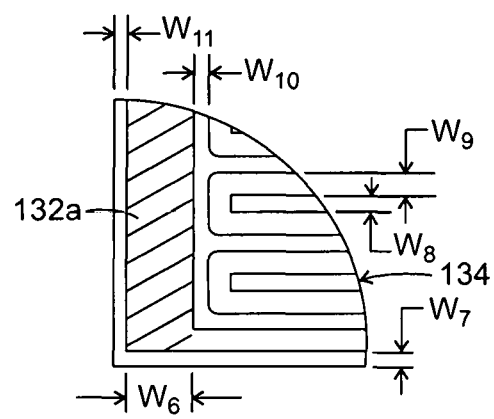
FIG. 3B is an enlarged top view section of one portion of the first type resistive heating element and lead pattern.
Figure 4:
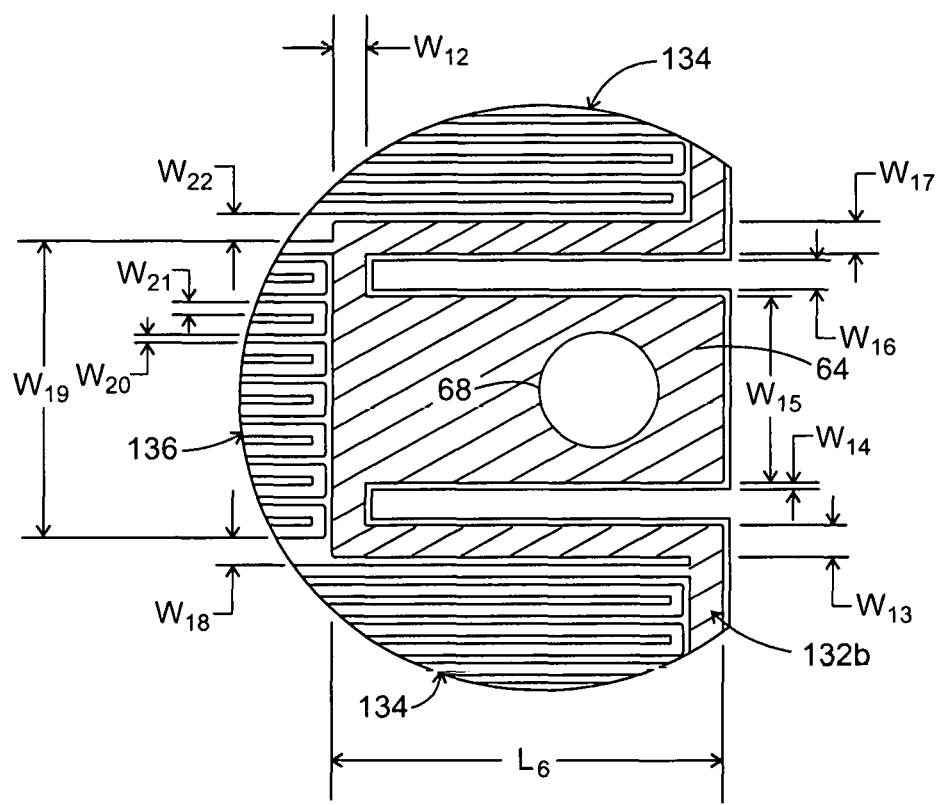
FIG. 4 is an enlarged top view section of portion of resistive heating elements, leads and electrical contact tab.

Referring now to FIGS. 3A, 3B, and 4, a top view of flexible substrate heater circuit assembly 130 is seen comprising first type resistive heating element 134 and second type resistive heating element 136 whose number of serpentine lines per heater segment, line widths W9, W21 and line spacings W8, W20 are selected to provide substantially equal resistance within each heater segment. The equal resistance among all first type resistive heating elements 134 and second type resistive heating element 136 as well as the uniformity of line widths W9, W21 and line spacings W8, W20 within each heater segment enables heating power to be substantially uniform over the entire surface area of flexible substrate heater circuit assembly 130. Electrically conductive bus strips 132a, 132b are seen at either end of first type resistive heating elements 134 and second type resistive heating element 136. As seen in FIG. 3A, there are a total of ten first type resistive heating elements 134 (five above and five below the second type resistive heating element 136) and one second type resistive heating element 136. A single flexible substrate heater circuit assembly 130 as seen in FIG. 3A may be dimensioned so that it substantially covers and is in thermal communication with the entire surface area of the back surface (i.e., side opposite the food cooking surface side) of first plate 52a of high thermal conductivity material or 52b of high thermal conductivity material seen in FIG. 1.

Figure 1B:
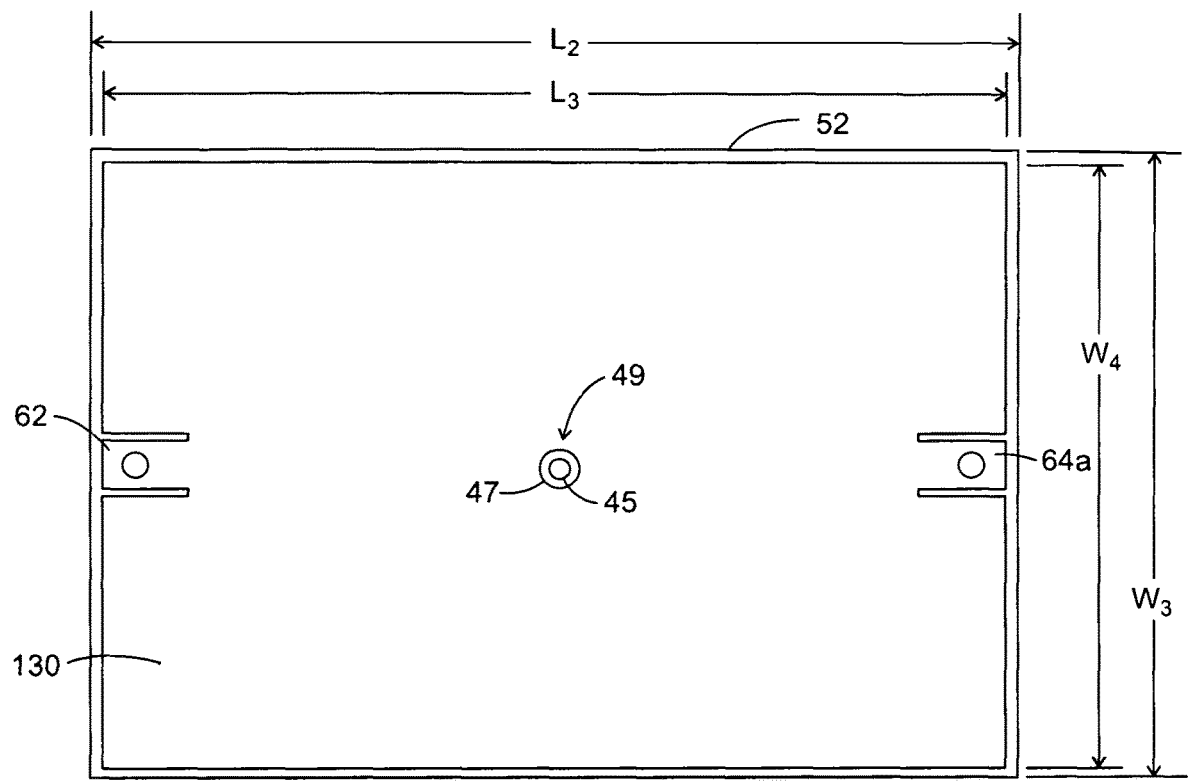
FIG. 1B is a top view of bottom surface of first plate with two heater segments adhesively bonded to a single first plate.
Figure 6:
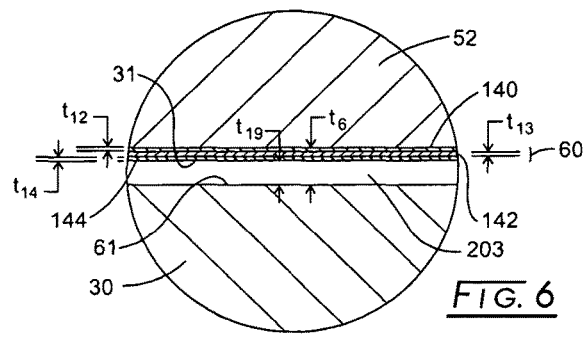
FIG. 6 is an enlarged partial view of first plate of high thermal conductivity material and flexible substrate heater circuit assembly showing one embodiment of the attachment of flexible substrate heater circuit assembly to first plate using high-temperature, thermally conductive adhesive.

By way of example and referring to FIGS. 1, 1B and 5, width, W3 dimension of first plate 52 may be 6.3 inches and length, L2 dimension may be 7.9 inches. The flexible substrate heater circuit assembly 130 width, W4 may be 6.0 inches and length, L3 may be 7.8 inches as seen in FIGS. 1B and 3A. The flexible substrate heater circuit assembly 130 is surmounted on first plate 52 of high thermal conductivity material using a high-temperature, thermally conductive adhesive 140 as seen in FIG. 6. Power leads 158 and 160 from controller 20 would be connected to first electrical contact pad 62 and second electrical contact pad 64, respectively, of flexible substrate heater circuit assembly 130. Temperature sensor 39 is in thermal communication with first plate 52 of high thermal conductivity material at a geometrical center position 43 of first plate 52 through opening 47 in flexible substrate heater circuit assembly 130 segment as seen in FIG. 1B. Term "geometrical center position" as used herein refers to a position that is equidistant from all four sides comprising the perimeter of first plate 52. By way of example, in the present example where the width W3 and length L2 are 6.3 inches and 7.9 inches, respectively, the geometrical center position of first plate 52 would be 3.15 inches from the 6.3-inch long side and 3.95 inches from the 7.9-inch long side. In the case of the present example, temperature sensor 39 may be placed in thermal communication with the first plate 52 of high thermal conductivity material by mechanically attaching a washer-type thermocouple using a No. 6 machine screw 41 secured into a "blind" machined hole 45 in the bottom surface of first plate 52, the machined hole having a diameter of nominally 0.138 inch corresponding to the machined hole required for a No. 6-32 machine screw. By way of example, washer-type thermocouples are available from Omega Engineering, Inc., Norwalk, Conn. and are designated Model No. WT(K)-6-12. Several preferred high-temperature, thermally conductive adhesive 140 materials are identified in the description that follows.

Still referring to FIGS. 3A, 3B, and 4, the resistive heating element serpentine legs and electrically conductive bus strips 132a, 132b are disposed on an electrically insulative substrate 142 (see FIG. 6). By way of example, electrically insulative substrate 142 may be a flexible polyimide film material of thickness t13 such as KAPTON® MT having a thermal conductivity of 0.0046 watts/cm-C available from DuPont (Wilmington, Del.). The preferred use of a higher thermal conductivity, electrically insulative substrate 142 such as Kapton MT (available from DuPont, Wilmington, Del.), having a thermal conductivity of 0.0046 watts/cm-C, enables the use of high thermal conductivity, metal or graphite powder-filled adhesives to attach the electrically insulative substrate 142 to first plate 52. By way of example, the electrically insulative substrate 142 side of the flexible polyimide substrate, wherein the electrically insulative substrate 142 is Kapton® MT, may be bonded directly to the surface on the side of first plate 52 opposite the cooking surface using EPO-TEK H20E silver-filled screen printable, thermally conductive adhesive (available from Epoxy Technology, Inc., Billerica, Mass.) to form adhesive layer 140 having a thermal conductivity of 0.025 watts/cm-C and a continuous use temperature of 230 C. For the case of a first plate 52 having preferred dimensions and a surface area of 50 square inches (322 square centimeters), the combined temperature difference across a 0.001-inch thick Kapton MT electrically insulative substrate 142 and 0.003-inch thick EPO-TEK H20E adhesive layer 140 is only 6.1 C during the application of the maximum power level of 2300 watts (corresponding to the application of 115 volts at 20 amps) during heat-up from the isothermal cooking plate assembly 50 from room temperature (e.g., 25 C) to the operator-selected set-point temperature (e.g., 150 C). During periods of cooking at a loading factor of 60%, the combined temperature difference across a 0.001-inch thick Kapton MT electrically insulative substrate 142 and 0.003-inch thick EPO-TEK H20E adhesive layer 140 is only 2.2 C.

As seen in FIG. 3A, bus strip 132a terminates in first electrical contact pad 62 and bus strip 132b terminates in second electrical contact pad 64. Bus strips 132a, 132b, first electrical contact pad 62 and second electrical contact pad 64 are copper plated with thickness t15 to minimize electrical resistance and resistive heating in bus and contact pad components. In addition, copper-plated bus components and contact pads are over-plated with gold of thickness t16 to prevent oxidation of copper and reduce electrical contact resistance at interface between contact pads 62, 64 and first or second washer-type electrical contacts 150, 152, respectively as seen in FIG. 5.

Still referring to FIGS. 3A, 3B, and 4, the preferred material for first type resistive heating element 134 and second type resistive heating element 136 is a conductor having a low temperature coefficient of resistance, preferably less than 500 ppm/degree C., more preferably less than 200 ppm/degree C. A low temperature coefficient of resistance of the resistive heating elements 134, 136 allows maximum heating power to be delivered to flexible substrate heater circuit assembly 130 with widely available line voltages (viz., 115 volts in the United States) even as the temperature of resistive heating elements 134, 136 increases from room temperature to the maximum operator-selectable set-point temperature for the first plate 52 of the isothermal cooking plate assembly 50 (viz., 230 C or 450 F). One suitable metal alloy exhibiting a low temperature coefficient of resistance is Constantan having a low temperature coefficient of resistance of 30 ppm/degree C. and available from Hamilton Precision Metals (Lancaster, Pa.). By way of example, first type resistive heating element 134 and second type resistive heating element 136 may formed by first bonding a sheet of Constantan of thickness t14 to electrically insulative substrate 142 using a high-temperature polyimide adhesive with setback distances W7, W11 between the perimeter edges of electrically insulative substrate 142 and Constantan sheet. Next, photolithography is used to selectively remove Constantan material to form serpentine line widths and line spacings as well as define bus and contact pad components. Finally, portions of photoetched Constantan designated to be electrically conductive bus strips 132a, 132b, first contact pad 62 and second contact pad 64 are selectively copper-plated and gold over-plated as described above.

Referring to FIGS. 3A, 4, and 5, holes 66, 68 of diameter D8 are seen in first electrical contact pad 62 and second electrical contact pad 64, respectively. These holes 66, 68 enable passage of mechanical fastening screws 154 and 156, respectively as seen in FIG. 5.

Referring to FIG. 5, thermally conductive first plate 52 is seen having a continuous and uniform thickness, t2 over the cooking surface having length, L2 and width, W3. Back side 31 of thermally conductive first plate 52 is separated from front side 61 of thermally insulative second plate 30 by air gap 203 having thickness, t19. Also, in the preferred embodiment seen in FIG. 5, the entire top cooking surface that can come in contact with food being cooked as well as the front edge surface of first plate of high thermal conductivity material are covered with a non-stick coating 54 having thickness, t11.

Isothermal Cooking Plate Heat Transfer Analyses

The preferred design of the first plate 52 of the isothermal cooking plate assembly 50 of the present disclosure is capable of rapid heat-up from 25 C (i.e., room temperature)

to a cooking temperature of 150 C within less than about 30 seconds using up to 20 amps at 115 volts (i.e., widely available line power) while maintaining the cooking surface of first plate 52 within 10 degrees C. of the set-point temperature (e.g., 150 C) throughout the entire zone of food 53 being cooked. The attainment of a rapid heat-up, isothermal cooking plate assembly 50 for a full range of cooking conditions using widely available 115-volt line power required the optimization of the first plate 52 surface area, length-to-width aspect ratio of first plate 52, thickness, t2 of first plate 52 and material of construction of first plate 52. The optimization of the design of the isothermal cooking plate assembly 50 of the present disclosure was achieved by performing heat transfer analyses for a full range of first plate 52 lengths, widths, thicknesses, materials of construction and loading factors. The term "loading factors" refers to the amount of food 53 simultaneously being cooked and the distribution of portions of food 53a, 53b, on the cooking surface of first plate 52. The unit of measure of loading factor is a percentage and refers to the fraction of the total cooking surface of first plate 52 covered by one or more portions of food 53. For example, if the combined area of the articles of food 53 being cooked is 20 in$^2$ and the cooking surface area of first plate is 50 in$^2$, then the loading factor is 20/50 in$^2$ or 40%.

The thermal model used in these heat transfer analyses accurately represents actual known cooking conditions for commercially available griddles. In this regard, the cooking industry has developed uniform testing procedures to evaluate the performance and efficiency of commercially available cooking appliances (see Kaufman, D., et. al., "Development of Uniform Testing Procedures for Commercial Cooking Appliances—Griddles", Archives of American Council for Energy Efficient Economy, 1988 Archives, ACEEE 1988 Proceedings, Volume 4-008, pages 4.70-4.81).

Figure 9:
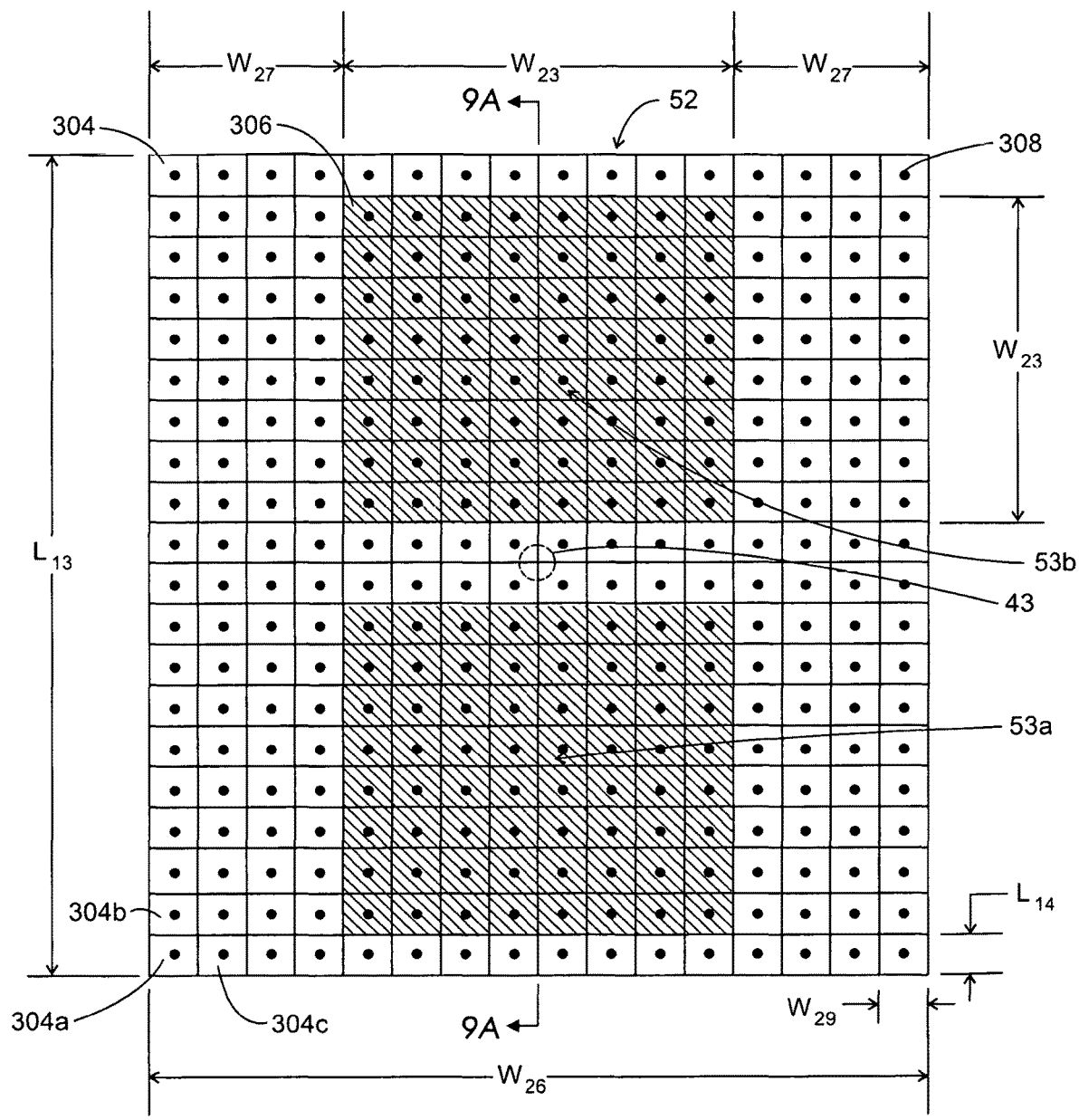
FIG. 9 is a detailed top view of a thermal model used to perform heat transfer analyses of alternative first plate designs.

The test procedure described in the above referenced report includes the specification of the standard food portion used to evaluate the performance and efficiency of griddles. The standard food portion is one or more one-quarter pound hamburger patties containing 20% fat (by weight) and moisture content of 60% to 65%. The amount of energy transferred to the hamburger food portion in the above referenced study was determined to be 475 BTU/pound of hamburger. In the cited standard testing procedure, the adequate cooking of the standard hamburger patty was achieved in 7.83 minutes or 0.1305 hours. The above standardized energy requirement of 475 BTU/pound of hamburger delivered in 0.1305 hours results in a heating power input of 3,640 BTU/hour per pound of hamburger, which is equivalent to 1,067 watts per pound of hamburger or 267 watts per one-quarter pound hamburger. The thermal model assumed each food portion was a one-quarter pound hamburger and the average heat input, $Q_{food}$ during the period of cooking each one-quarter pound hamburger was 267 watts. The heat input per unit area or heat flux into the portion of food 53 was determined by dividing 267 watts by the area of the portion of food 53 (e.g., hamburger patty). The example thermal model seen in FIG. 9 includes two shaded regions that represent two food portions 53a and 53b (viz., two hamburger patties). Each food portion 53a and 53b is comprised of 64 food portion subregions 306. Hence, the heat flux into an individual food portion 53a or 53b is 267 watts divided by the area of 64 food portion subregions 206. Since the length, L14 is 0.394 inch (1.00 cm) and width, W29 is 0.394 inch (1.00 cm) for all food portion subregions 306 (as well as all first plate subregions 304), the total area of each food portion 53a and 53b seen in FIG. 9 is 64 cm$^2$.

The heat flux into each food portion subregion 306 is 267 watts divided by 64 cm$^2$ or 4.17 watts/cm$^2$.

Those portions of the cooking surface of the first plate 52 not covered by one or more portions of food 53 were assumed to dissipate heat 332 to the environment by free convection heat transfer and radiation heat transfer based on a surface emittance of 0.9 corresponding to the actual radiation emittance of typical non-stick coatings. The free convection heat transfer, $Q_{conv}$ from each of the exposed cooking surfaces of each first plate subregion 304 of first plate 52 that are not covered by one or more portions of food 53. The free convection heat transfer, $Q_{conv}$ is based on the well-known convection heat transfer equation:

$$Q_{conv}=h*A_{subregion}*(T_{subregion}-T_0) \quad \text{(Equation 1)}$$

In the above Equation 1, the free-convection heat transfer coefficient, h for a horizontal plate facing upward is 9.5× 10$^{-4}$ watts/(cm$^2$-C). The term $A_{subregion}$ in the above equation refers to the exposed surface area (in units of square centimeters) of each of the first plate subregions 304 not covered by a food portion subregion 306 of food portion 53. The term $T_{subregion}$ refers to the temperature of each first plate subregion 304 and the term $T_0$ refers to the ambient or room temperature, both in same units of either degrees Celsius (C) or degrees Kelvin (K).

The radiation heat transfer, $Q_{rad}$ from each of the exposed cooking surfaces of each first plate subregion 304 the of the first plate 52 that are not covered by one or more portions of food 53 is based on the well-known radiation heat transfer equation:

$$Q_{rad}=\sigma*\varepsilon*A_{subregion}*(T'_{subregion}{}^4-T'_0{}^4) \quad \text{(Equation 2)}$$

In the above Equation 2, σ refers to the Stefan-Boltzmann constant that has the value 5.67×10$^{-12}$ watts/cm$^2$-K$^4$. The term c refers to the radiation emittance of the exposed surface of each of the first plate subregions 304 not covered by a food portion subregion 306 of food portion 53. For the assumed covering of the cooking surface of first plate 52 with a non-stick coating, the corresponding unitless radiation emittance of such coatings is nominally 0.9. The term $A_{subregion}$ in the above equation refers to the exposed surface area (in units of square centimeters) of each of the first plate subregions 304 not covered by a food portion subregion 306 of food portion 53. The term T'$_{subregion}$ refers to the temperature of each first plate subregion 304 and the term T'$_0$ refers to the ambient or room temperature, both in the same units of degrees Kelvin (K) since the Stefan-Boltzmann constant is in reciprocal units of degrees Kelvin raised to the fourth power. The absolute Kelvin temperature scale is defined as the temperature in degrees Centigrade plus 273. By way of example, a temperature of 150 Centigrade corresponds to a temperature of 150 C+273 or 423 Kelvin.

Figure 9A:
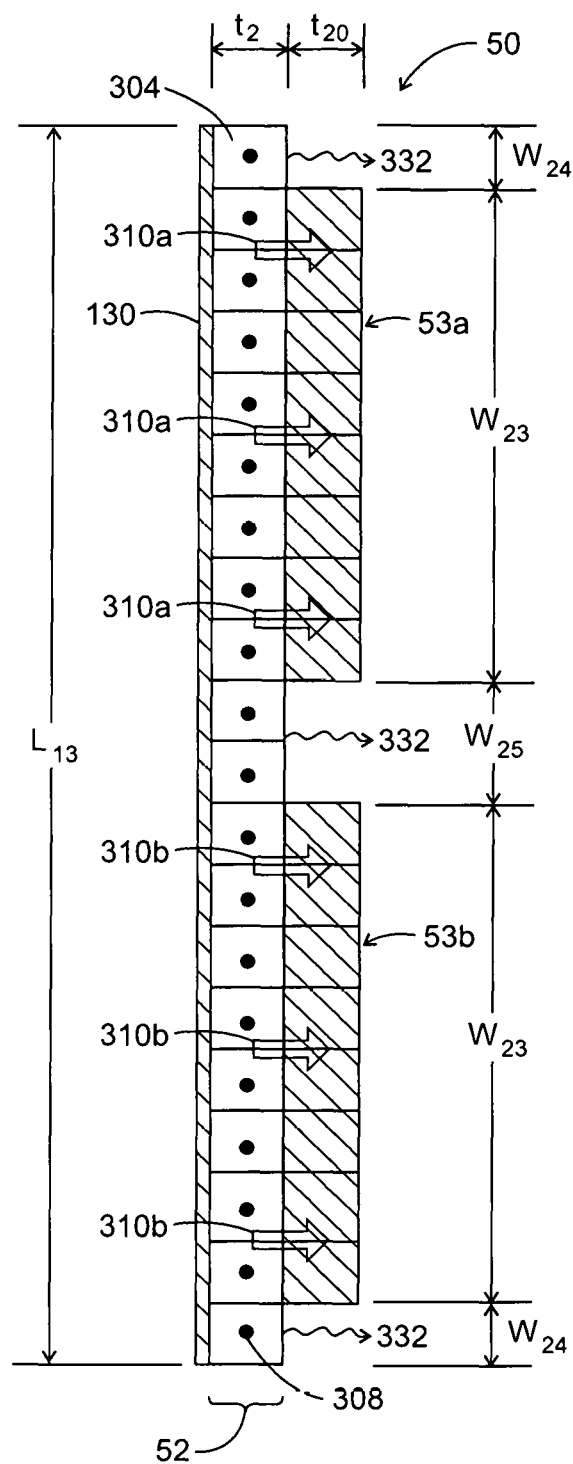
FIG. 9A is a detailed cross-sectional view of a thermal model used to perform heat transfer analyses of alternative first plate designs.

The thermal model used for the heat transfer analysis of alternative designs for a first plate 52 is based on distributed uniform heating by a heater circuit assembly 130 surmounted on essentially the entire back surface area of first plate 52 as seen in FIGS. 1B, 5 and 9A. Each alternative design for first plate 52 was divided into 320 first plate subregions 304 as seen in FIGS. 9 and 9A. Each first plate subregion 304 is defined by a length, L14, width, W29 and thickness, t2 as seen in FIGS. 9 and 9A. In the thermal models seen in FIGS. 9 through 12, the length, L14 of each first plate subregion 304 is 0.394 inch (1.00 centimeter) and the width, W29, of each first plate subregion 304 is 0.394 inch (1.00 centimeter). The values of the uniform thickness, t2 of each of the 320 first plate subregions 304 in the thermal models seen in FIGS. 9 through 12 ranged from a thickness of 0.0394 inch (0.1 centimeter or 1.00 millimeter) to 0.375 inch (0.953 centimeter).

At the geometrical center of each first plate subregion 304 is a temperature node 308 corresponding to the computed temperature for each the first plate subregion 304. Each heat transfer analysis case produced a total of 320 temperatures at each temperature node 308 corresponding to each of the 320 first plate subregions 304.

The heat input per unit area of the portion of food 53 discussed above (viz., 267 watts per one-quarter pound hamburger divided by the area of the portion of food 53) was converted into the heat input for each food portion subregion 306 supplied by each corresponding adjacent first plate subregion 304 in direct contact with the adjacent food portion subregion 306 as seen in FIGS. 9 and 9A and indicated by heat conduction arrows 310a and 310b into food portions 53a and 53b, respectively, as seen in FIG. 9A.

The total heat input, $Q_{total}$ that is required to be generated within the heater circuit assembly 130 surmounted on each first plate 52 of the isothermal cooking plate assembly 50 is initially estimated by combining the total heat required for cooking one or more food portions 53, $Q_{food}$ with the estimated free convection heat dissipation, $Q_{conv}$ and estimated radiation heat dissipation, $Q_{rad}$ from the exposed surfaces of first plate 52 not covered by one or more food portions 53. An energy balance equation is solved by iterative heat transfer analyses using an incrementally adjusted value for the total heat input, $Q_{total}$ until the first plate subregion 304 at the corresponding thermocouple location 43 is at the specified set-point temperature (e.g., 150.0 C) as seen in FIG. 9. The performance of iterative heat transfer analyses is necessary since the free convection and radiation heat dissipation values, $Q_{conv}$ and $Q_{rad}$ are initially estimated based on assumed temperatures at temperature nodes 308 (e.g., assumed to be at the set-point temperature of 150 C) for all exposed first plate subregions 304 not covered by food portion subregions 306. The computer-based heat transfer analysis generates steady state temperatures corresponding to the temperature nodes 308 at each of the 320 first plate subregions 304. However, since the computed temperatures for the exposed first plate subregions 304 not covered by food portion subregions 306 will be different from the initially assumed set-point temperature (corresponding to the heated first plate 52 without any heat dissipation into one or more portions of food 53 in contact with first plate 52), then the actual computed free convection and radiation heat dissipation losses will be different that the initially assumed losses corresponding to the entire first plate 52 being at an assumed temperature equal to the selected set-point temperature (e.g., 150 C). The total heat input, $Q_{total}$ is incrementally adjusted until the temperature of the temperature node 308 that corresponds to thermocouple location 43 is equal to the selected set-point temperature (e.g., 150.0 C).

The heat transfer analyses were performed using a thermal analysis computer program developed and validated by the Lawrence Livermore Laboratory and known as the TRUMP computer program (see Edwards, Arthur L., "TRUMP: A Computer Program for Transient and Steady-State Temperature Distribution in Multidimensional Systems", UCRL-14754, Rev. 3, Lawrence Livermore Laboratories, 1972), the disclosure of which is expressly incorporated herein by reference. There are at least a dozen other heat transfer computer programs that could alternatively be used for the thermal analyses performed for the present disclosure including [1] ANSYS Computer Program available from ANSYS, Inc., Canonsburg, Pa. and [2] NASTRAN Computer Program available from MSC Software, Newport Beach, Calif. The TRUMP thermal analysis computer program, like other similar thermal analysis computer programs, solves general nonlinear parabolic partial differential equations describing flow in various kinds of potential fields such as temperature fields.

The steady state heat transfer analysis performed by the TRUMP computer program involves a first plate 52 comprising a continuous sheet of high thermal conductivity material having a uniform thickness, t2. The flow of a quantity of heat, q, within the first plate 52 is via conduction heat transfer governed by the well-known conduction heat transfer provided below:

$$q = k^*(A_{cond}/L_{cond})^*(T_2 - T_1) \quad \text{(Equation 3)}$$

The heat flow, q in Equation 3 is in units of watts. The term k in Equation 3 refers to the thermal conductivity of the material comprising first plate 52 and is expressed in units of watts/cm-C. The term $A_{cond}$ in Equation 3 represents the cross-sectional area through which heat flows from a first region to a second region. In the thermal model illustrated in FIGS. 9 and 9A, heat conduction occurs between all adjacent first plate subregions 304. By way of example and referring to FIG. 9, heat conduction occurs between first plate subregion 304a and first plate subregion 304b as well as between first plate subregion 304a and first plate subregion 304c. Likewise, heat conduction occurs between all adjacent first plate subregions 304 of first plate 52 among the 320 first plate subregions 304. As seen in FIG. 9, each of the 320 first plate subregions 304 has a length, L14 and width, W29 whose values are both 0.394 inch (1.00 cm). Since the term $A_{cond}$ represents the cross-sectional area between all adjacent first plate subregions 304, then $A_{cond}$ is equal to the product of [a] the length or width of the first plate subregion 304 and [b] the thickness, t2 of first plate subregion 304. By way of example, for the case of a first plate 52 having a uniform and continuous thickness, t2 of 0.250 inch (0.635 cm), the $A_{cond}$ parameter is equal to the product 0.635 cm×1.00 cm or 0.635 cm². The terms T1 and T2 in Equation 3 refer to the computed temperatures at the geometric center or temperature node 308 associated with each adjacent first plate subregion 304. The term Lcond in Equation 3 refers to the distance between the geometric centers of a first plate subregion 304a and first plate subregion 304b. The geometric centers of each first plate subregion 304 are, by definition, coincident with each of the first plate temperature nodes 308. Since the length, L14 and width, W29 of each first plate subregion 304 are both 0.394 inch (1.00 cm), then the distance between the geometric centers of each first plate subregion 304 is likewise 0.394 inch (1.00 cm)

By way of example and referring to FIG. 9, the amount of heat conduction, q between first plate subregion 304a and first plate subregion 304b can be expressed using Equation 3 as follows:

$$q(304a, 304b) = k^*((W29^*t2)/L14)^*(T_{304b} - T_{304a}) \quad \text{(Equation 4)}$$

For the case of an Aluminum 1100 first plate 52 having a thermal conductivity of 2.18 watts/cm-C, a thickness t2 of first plate 52 of 0.635 cm, a length L14 of 1.00 cm and width W29 of 1.00 cm, Equation 4 can be expressed as follows:

$$q(304a, 304b) = 2.18^*0.635^*(T_{304b} - T_{304a}) \quad \text{(Equation 5)}$$

As seen in Equation 4, the larger the value of the thermal conductivity, k of first plate 52 and the larger the value of thickness, t2 of first plate 52, the larger the amount of heat that can be conducted between adjacent first plate subregions 304 for a given temperature difference or gradient ($T_{304b}$–$T_{304a}$). Therefore, since one of the objectives of the present disclosure for an isothermal cooking plate assembly 50 is to enable the largest amount of heat to be conducted under conditions of small temperature differences between the set-point temperature and temperatures within the region of the portion of food 53 being cooked, the thermal conductivity of the first plate 52 should be large and the thickness, t2 of the first plate 52 should be large.

The term "isothermal" as used herein refers to the achievement of temperatures within the region(s) of the portion(s) of food 53 being cooked that are substantially the same or within not greater than 10 C of the set-point temperature of the isothermal cooking plate assembly 50. For set-point temperatures up to 230 C (450 F), the criterion for achieving an isothermal cooking plate assembly 50 is the requirement that the temperatures within the region(s) of the portion(s) of food 53 being cooked are within about 10 C of the set-point temperature.

However, it is also one of the objectives of the present disclosure to provide an isothermal cooking plate assembly 50 that can be heated from room temperature to a user selected set-point temperature (e.g., 150 C) within a brief period of less than 30 seconds to maximize the energy and operator time efficiency associated with cooking food. The capability to heat first plate 52 of an isothermal cooking plate assembly 50 from room temperature to 150 C within 30 seconds or less enables the consumption of electrical power and expenditure for associated electricity costs only when a requirement for cooking food occurs (e.g., a customer orders one or more cooked hamburgers or other cooked food items).

The time required for the heat-up of an isothermal cooking plate assembly 50 from room temperature to a user selected set-point temperature for the first plate 52 of the isothermal cooking plate assembly 50 is determined by the well known equation for heat capacitance of a known volume of material having defined values of density and specific heat. By way of example, the time required to heat a first plate 52 plate from 25 C to 150 C having known dimensions and constructed using a known material is based on the well known definition of the specific heat, C of any material. The specific heat of any material is the amount of heat, Q required to raise the temperature, T of the mass, m of one gram of material by one degree Celsius. Based on the definition of the specific heat of a material, the rate of heat up, $\Delta T/\Delta t$ at which the temperature, T of a material will increase per unit time, t is given by the well-known equation:

$$\Delta Q/\Delta t = m^* C^* \Delta T/\Delta t \qquad \text{(Equation 6)}$$

The mass, m, of the first plate 52 of an isothermal cooking plate assembly 50 (in grams) is the product of the volume of the cooking plate, V and the density, $\rho$ of the material comprising the first plate 52 (e.g., Aluminum 1100). Hence, Equation 6 can be expressed in terms of the density, $\rho$ of the material comprising first plate 52 (in units of grams/cm$^3$) and the volume, V of first plate 52 (in units of cm$^3$). Referring to FIG. 9, the volume, V of any first plate 52 having a square or rectangular surface geometry is equal to the product of the length L13, the width W26 and the thickness t2. The specific heat, C, of the first plate 52 of the isothermal cooking plate assembly 50 is expressed in units of calories/gram-C. The amount of heat, $\Delta Q/\Delta t$, applied to the cooking plate (in units of calories/second) is equivalent to the applied heating power to the heater circuit assembly 130 (in units of watts) divided by 4.186 to convert watts into units of calories per second.). The rate of heating, $\Delta T/\Delta t$ in Equation 6 is defined as the amount of temperature increase, $\Delta T$ (in units of Celsius degrees) divided by the amount of time, $\Delta t$ required for the temperature change (expressed in units of seconds). Referring to FIGS. 9 and 9A, Equation 6 above can then be expressed in the form of the rate of heat up, $\Delta T/\Delta t$ by rearranging terms and expressing the mass, m in terms of its constituent components as follows:

$$\Delta T/\Delta t = (\Delta Q/\Delta t)/(L13^*W26^*t2^*\rho^*C) \qquad \text{(Equation 7)}$$

The calculated time, $t_{heatup}$ required to heat up first plate 52 of the isothermal cooking plate assembly 50 to a desired set-point temperature, $T_{setpoint}$ is determined by dividing the required temperature rise from room temperature, $T_0$ (e.g., from 25 C) to 150 C or a temperature rise of 125 C by the calculated rate of heat up, $\Delta T/\Delta t$. Accordingly, the heat-up time for first plate 50 is determined by Equation 7 as shown below:

$$t_{heatup} = (T_{setpoint} - T_0)/(\Delta T/\Delta t) = (T_{setpoint} - T_0)^* (L13^*W26^*t2^*\rho^*C)/(\Delta Q/\Delta t) \qquad \text{(Equation 8)}$$

This computational process was used to calculate the time required to heat up the first plate 52 of isothermal cooking plate assembly 50 from 25 C to 150 C for thicknesses, t2 of first plate 52 ranging from 0.120 inch (0.305 cm) to 0.375 inch (0.953 cm) for a maximum level of applied power, ($\Delta Q/\Delta t$) of 2300 watts or 549.5 calories/second into heater circuit assembly 130 (corresponding to an input voltage of 115 volts at 20 amps). The specific heat, C of Aluminum 1100, the preferred material for the first plate 52, is 0.216 calories/gram-C and the density of Aluminum 1100 is 2.71 gram/cm$^3$. For comparison purposes with a prior art cooking plate comprised of iron, the specific heat, C value of iron is 0.124 calories/gram-C and the density of iron is 7.87 gram/cm$^3$. The length, L13 and width, W26 of the first plate 52 used in the calculation of heat up rates was based on the results of the thermal analysis of a range of sizes of first plate 52 to determine the range of sizes of first plate 52 that achieved the objective of an isothermal cooking plate assembly 50, viz., a first plate 52 in which the maximum temperature difference, $\Delta T_{max}$ between the set-point temperature, $T_{setpoint}$ and any temperature in the zone where an article of food is being cooked does not exceed 10 C for set-point temperatures, $T_{setpoint}$ up to 230 C (450 F).

A total of 118 heat transfer analyses were performed using the TRUMP computer program and the thermal models shown in FIGS. 9, 9A, 10, 11 and 12. The thermal models for these heat transfer analyses were based on a range of lengths L13, widths W26 and thicknesses t2 as defined in FIGS. 9 and 9A. The values for the density, p and specific heat, C for first plate 52 correspond to the published material properties for Aluminum 1100 and iron as specified above. The values for the thermal conductivity used in these heat transfer analyses ranged from 1.67 to 2.18 watts/cm-C for the case of a first plate 52 comprising aluminum and 0.675 watts/cm-C for the case of a first plate 52 comprising iron. The temperature distribution of the 320 first plate subregions 304 was determined by the TRUMP computer program under steady state conditions, i.e., under conditions in which all subregions have reached an equilibrium state in which the temperatures are no longer increasing or decreasing.

Figure 10:
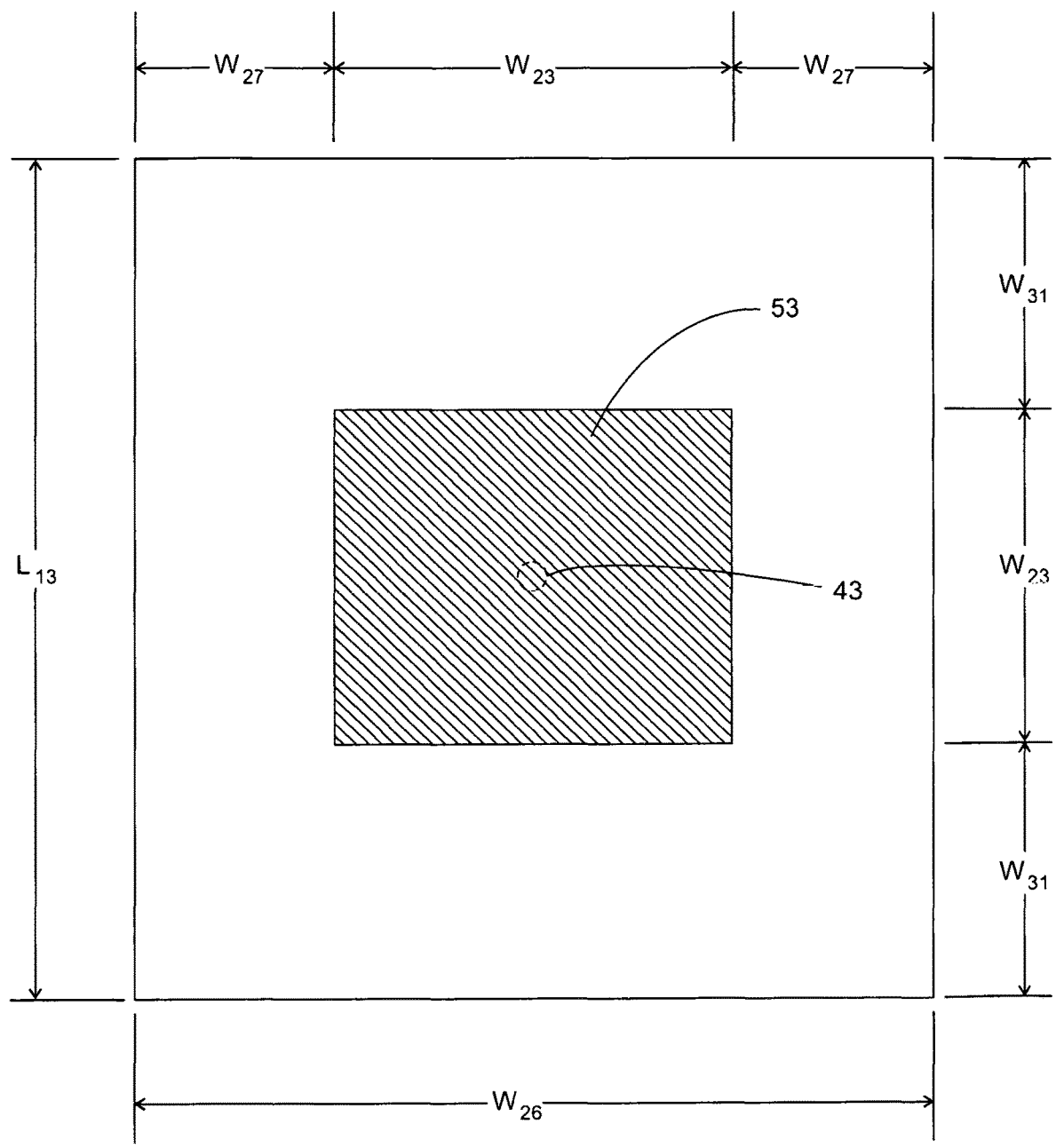
FIG. 10 is a top view of a thermal model used to perform heat transfer analyses of alternative first plate designs having a loading factor of 20% of food being cooked.
Figure 11:
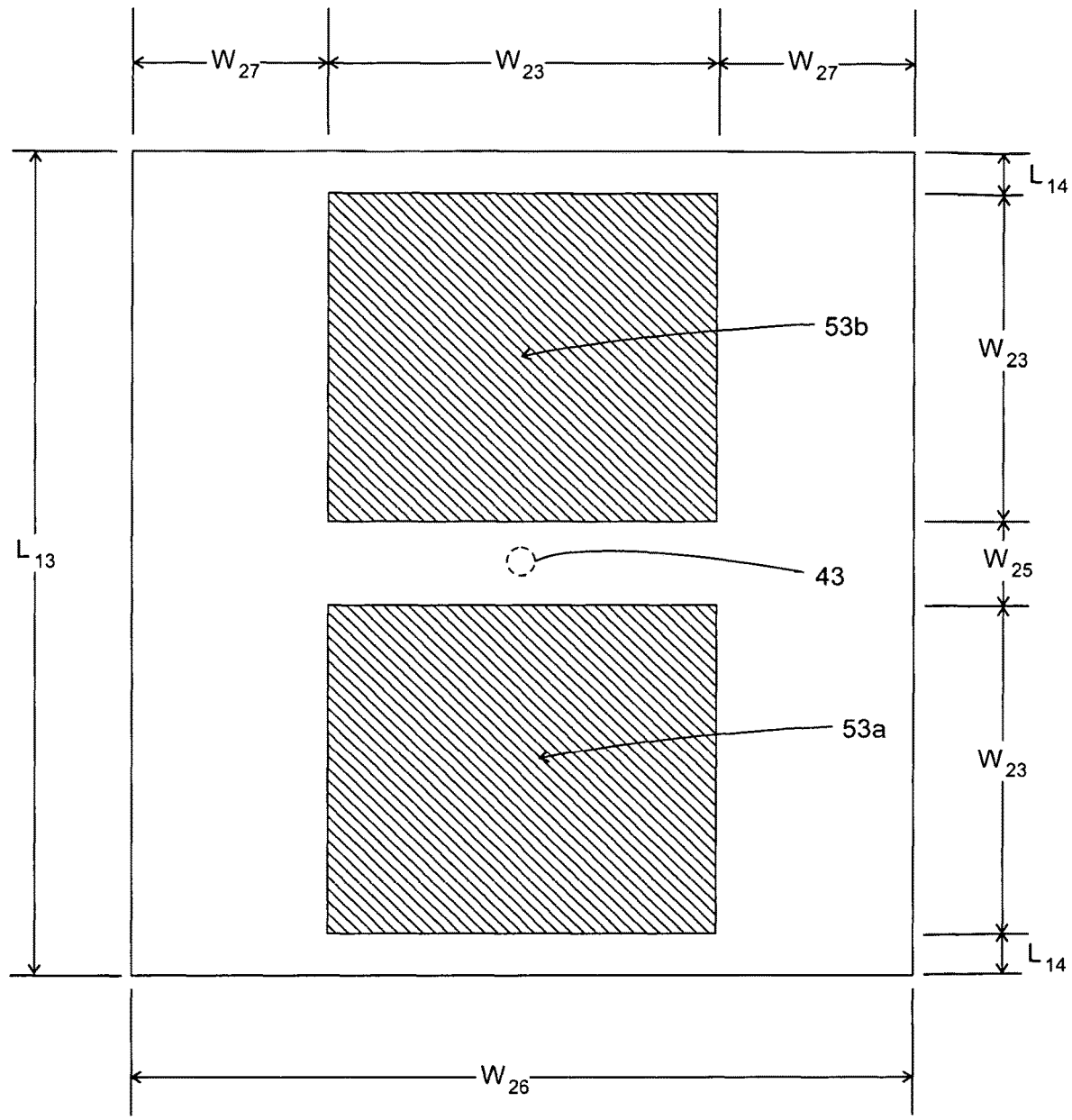
FIG. 11 is a top view of a thermal model used to perform heat transfer analyses of alternative first plate designs having a loading factor of 40% of food being cooked.
Figure 12:
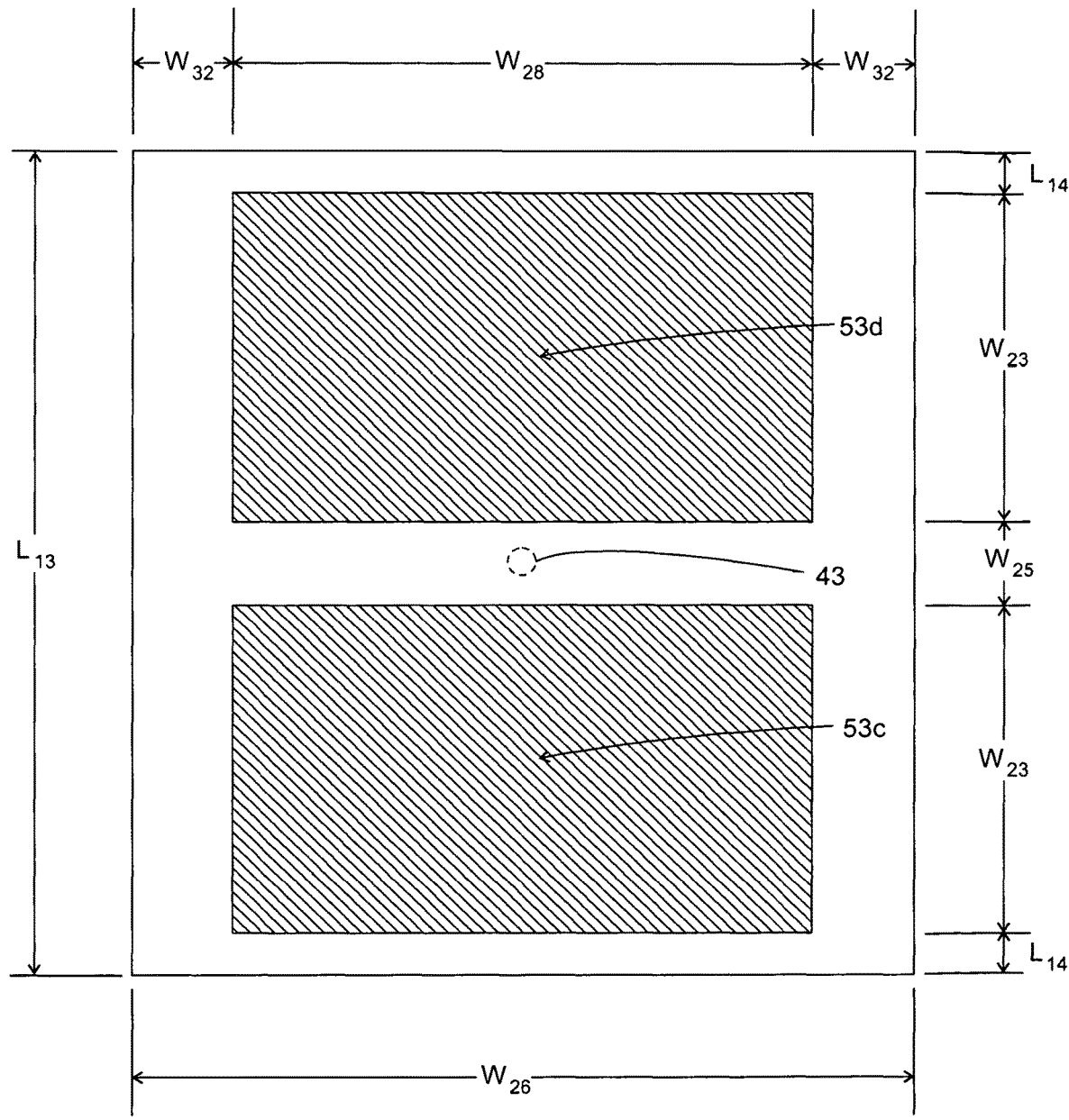
FIG. 12 is a top view of a thermal model used to perform heat transfer analyses of alternative first plate designs having a loading factor of 60% of food being cooked.

The temperature distribution among the 320 first plate subregions 304 is influenced by the loading factor of food being cooked. The term "loading factor" refers to the amount of food 53 simultaneously being cooked and the distribution of portions of food 53a, 53b, on the cooking surface of first plate 52. The unit of measure of loading factor is a percentage and refers to the fraction of the total cooking surface of first plate 52 covered by one or more portions of food 53. The effect of the loading factor on the temperature distribution of the 320 first plate subregions 304 was included in the 118 heat transfer analyses by specifying and performing heat transfer analyses on three different thermal models as seen in FIGS. 10, 11 and 12 corresponding to loading factors of 20%, 40% and 60%, respectively. As seen in FIG. 10, a single article of food 53 having a width and length of W23 is positioned in the central portion of the cooking surface of first plate 52 having an overall length, L13 and overall width, W26 and corresponds to a loading factor of 20%. As seen in FIG. 11, two articles of food 53*a* and 53*b*, having a width and length of W23, are positioned in the central portion of the cooking surface of first plate 52 having an overall length, L13 and overall width, W26 and corresponds to a loading factor of 40%. As seen in FIG. 12, two larger articles of food 53*c* and 53*d*, having a width, W23 and length, W28 are positioned in the central portion of the cooking surface of first plate 52 having an overall length, L13 and overall width, W26 and corresponds to a loading factor of 60%.

The TRUMP computer program was used to perform heat transfer analyses corresponding to 118 different designs for first plate 52 comprising different materials (e.g., Aluminum and iron) and a range of lengths, widths and thicknesses and provided steady-state temperature values for the 320 first plate subregions 304 at their temperature nodes 308 (as seen in FIGS. 9 and 9A). Referring to FIGS. 1, 1B, 2 and 5, the results of these 118 heat transfer analyses provided the optimum range of lengths L2, widths W3 and uniform thicknesses t2 of first plate 52 that meet the dual requirements for an isothermal cooking plate assembly 50 that include [a] the maximum allowed temperature difference between the set-point temperature and any first plate subregion 304 in contact with food 53 is not greater than 10 C for set-point temperatures up to 230 C and [b] a maximum time period for heat-up of first plate 52 from room temperature to a set-point temperature of 150 C of not greater than 30 seconds. The preferred design for the first plate 52 that meets the objective of an isothermal cooking plate assembly 50 requires that the maximum temperature difference, $\Delta T_{max}$ between the set-point temperature, $T_{setpoint}$ and any temperature in the zone where an article of food is being cooked does not exceed 10 C for any operator-selectable set-point temperature up to 230 C (450 F).

Based on the 118 heat transfer analyses performed using the TRUMP heat transfer computer program, the optimum length, L2 for a single first plate 52 heated by a single heater circuit assembly 130 surmounted on substantially the entire surface area on the back side of the first plate 52 (i.e., opposite the food cooking surface side) to achieve a maximum temperature difference, $\Delta T_{max}$ that does not exceed 10 C for any operator-selectable set-point temperature, $T_{setpoint}$ up to 230 C (450 F) is in the range from 7.2 to 9.0 inch. Also, based on these 118 heat transfer analyses, the optimum width, W3 for a single first plate 52 heated by a single heater circuit assembly 130 surmounted on substantially the entire surface area on the back side of the first plate 52 (i.e., opposite the cooking surface side) to achieve a maximum temperature difference, $\Delta T_{max}$ that does not exceed 10 C for any operator-selectable set-point temperature, $T_{setpoint}$ up to 230 C (450 F) is in the range from 6.0 to 7.2 inch. These optimum ranges of lengths, L2 and widths, W3 correspond to a maximum length to width aspect ratio of 9.0 inch/6.0 inch or 1.50.

Once the optimum range of lengths, L2 and widths, W3 for the first plate 52 were determined from the initial set of the heat transfer analyses, than a nominal length, L13 and width, W26 was selected for the purpose of computing the maximum temperature difference, $\Delta T_{max}$ between the set-point temperature, $T_{setpoint}$ and any temperature in the zone where an article of food is being cooked. In addition, referring to FIGS. 9, 9A, 10, 11 and 12, the nominal lengths, W23 or W28 and widths, W23 for the example articles of food 53 being cooked were selected based on typical weights and sizes of hamburgers being cooked. These dimensions and other dimensions of the thermal models seen in FIGS. 9, 9A, 10, 11 and 12 are specified in a subsequent section.

The results of the heat transfer analyses of alternative designs for first plate 52 determined the range of allowable length and width dimensions for first plate 52 that met the requirements for maintaining the maximum temperature difference between the operator-selected set-point temperature and any subregion 304 of first plate 52 in contact with one or more articles of food 53 to 10 C or less. The allowable length and width dimensions for first plate 52 (viz., a length in the range 7.2 to 9.0 inches and width in the range 6.0 to 7.2 inches) in combination with the allowable range of thicknesses of first plate 52 (viz., 0.187 to 0.275 inch) result in a volume of first plate 52 that can be heated up from 25 C to 150 C in less than 30 seconds using widely available line power of 115 volts at a maximum current of 20 amps. As a consequence, the preferred embodiments of the present disclosure eliminate the need for a 220 volt source of power and all of the associated construction complexities and costs of providing and using this higher voltage electrical service. In addition, the two-fold higher heat flux associated with powering the flexible heater circuit assembly 130 at 220 volts and 20 amps (i.e., 4,400 watts of power) is unnecessary to achieve a rapid heat-up within 30 seconds and only adds to the temperature difference across the interface between the flexible heater circuit assembly 130 and first plate 52. The only advantage of using of a source of 220-volt line power is to reduce the heat-up time from room temperature to the operator-selected set-point temperature. However, a maximum heat-up time of 30 seconds for a griddle system 10 powered by the widely available 115 volts and 20 amps eliminates the need for 220-volt line power source since the further reduction in heat-up time does not compensate for the added cost of supplying 220-volt service and operating the griddle system 10 at the voltage levels and the higher costs associated with the adhesives and the their application for use at the higher heat flux levels associated with the application of 4,400 watts of power per isothermal cooking plate assembly 50.

Figure 13:
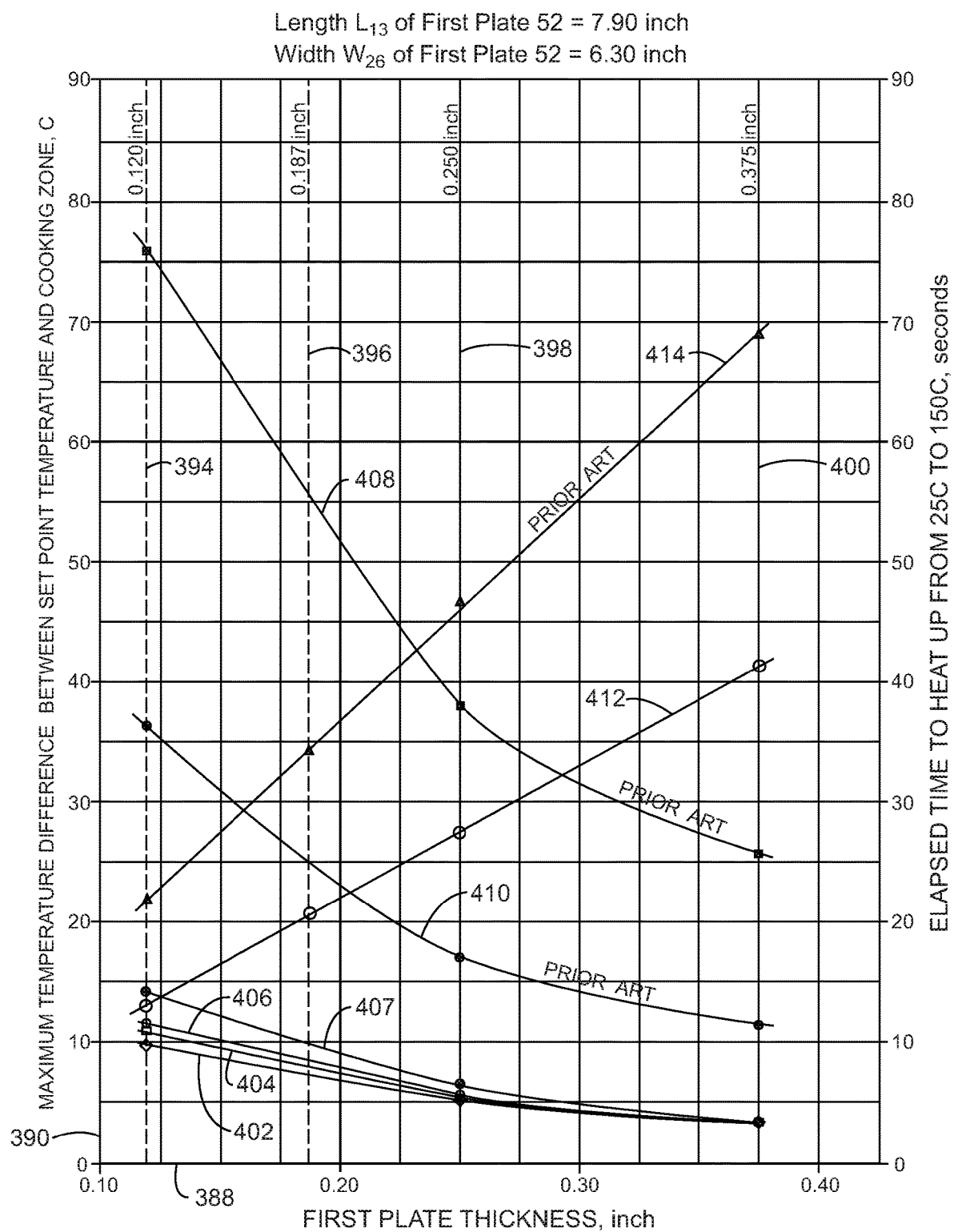
FIG. 13 is a graphical representation of the results of heat transfer analysis and calculations of time periods required for heat up of alternative first plate designs.

The results of the heat transfer analysis using the TRUMP computer program for thermal models seen in FIGS. 9, 9A, 10, 11 and 12 and nominal dimensions specified below are presented in FIG. 13. As seen in FIG. 13, the left ordinate is the maximum temperature difference, $\Delta T_{max}$ (in units of Celsius degrees) corresponding to the maximum temperature difference between the set-point temperature, $T_{setpoint}$ and any first plate subregion 304 within the cooking zone (i.e., zone of first plate 52 covered by one or more articles of food 53). Still referring to FIG. 13, the abscissa is the thickness of first plate 52 in units of inches. The heat transfer analyses were performed for thermally conductive first plate 52 thicknesses, t2 that included 0.120, 0.250 and 0.375 inch thicknesss, as seen in FIG. 13 at vertical lines 394, 398 and 400, respectively. First plate 52 thicknesses of 0.120, 0.250 and 0.375 inch were selected for heat transfer analyses since they correspond to standard commercially available sheets of Aluminum Types 1100 and 6061 in lengths of 48 inches and widths of 24 inches.

Curves 402, 404 and 406 in FIG. 13 for loading factors of 20%, 40% and 60%, respectively, correspond to the heat transfer analyses derived maximum temperature differences between the set-point temperature, $T_{setpoint}$ and any first plate subregion 304 within the cooking zone (i.e., zone of first plate 52 covered by one or more articles of food 53) based on data point values seen at first plate thicknesses of 0.120, 0.250 and 0.375 inch, respectively, for an aluminum first plate 52 having a length of 7.9 inch, width of 6.3 inch and thermal conductivity of 2.18 watts/cm-C corresponding to Aluminum Type 1100. Curve 407 in FIG. 13 for a loading factor of 60% corresponds to the heat transfer analyses derived maximum temperature differences between the set-point temperature, $T_{setpoint}$ and any first plate subregion 304 within the cooking zone (i.e., zone of first plate 52 covered by one or more articles of food 53) based on data point values seen at first plate thicknesses of 0.120, 0.250 and 0.375 inch, respectively, for an aluminum first plate 52 having a length of 7.9 inch, width of 6.3 inch and thermal conductivity of 1.67 watts/cm-C corresponding to Aluminum Type 6061.

Still referring FIG. 13, curves 408 and 410 for loading factors of 60% and 40%, respectively, correspond to the heat transfer analyses derived maximum temperature differences between the set-point temperature, $T_{setpoint}$ and any first plate subregion 304 within the cooking zone (i.e., zone of first plate 52 covered by one or more articles of food 53) based on data point values seen at first plate thicknesses of 0.120, 0.250 and 0.375 inch, respectively, for a first plate 52 having a length of 7.9 inch, width of 6.3 inch and thermal conductivity of 0.675 watts/cm-C corresponding to iron (prior art).

The first plate 52 is substantially uniform in thickness and in the form of a continuous sheet. The term "continuous sheet", as used herein to specify first plate 52, refers to a thermally conductive first plate 52 having a substantially uniform thickness without any partial or full thickness cutouts or slots other than [a] a small blind (i.e., partial depth) machined hole 45 at the geometrical center on the side of first plate 52 opposite the cooking side for mechanically securing temperature sensor 39 to first plate 52 and [b] small machined holes at the perimeter corners of first plate 52 opposite the cooking side for mechanically securing first plate 52 to second plate 30 using machine screws 82 having a diameter D3.

As seen in FIG. 13, curves 402, 404 and 406 represents the computed maximum temperature difference, $\Delta T_{max}$ for a first plate 52 comprising aluminum having a thermal conductivity of 2.18 watts/cm-C for loading factors of 20%, 40% and 60%, respectively. The computed maximum temperature difference, $\Delta T_{max}$ for a first plate 52 comprising aluminum having a thermal conductivity of 2.18 watts/cm-C and having a uniform thickness of 0.187 inch ranges from 7.3 C to 8.3 C and ranges from 5.3 C to 5.6 C at a thickness of 0.250 inch (see curves 402, 404 and 406 of FIG. 13). As seen in curve 407 of FIG. 13, the computed maximum temperature difference, $\Delta T_{max}$ for a first plate 52 comprising aluminum having a thermal conductivity of 1.67 watts/cm-C and having a uniform thickness of 0.187 inch is 10.0 C and is 6.6 C at a thickness of 0.250 inch. First plate 52 materials having a thermal conductivity of at least 1.67 watts/cm-C include Aluminum 6061 and Aluminum Nitride (e.g., Aluminum Nitride AlN 180 available from CoorsTek, Golden, Colo.).

Still referring to FIG. 13, prior-art cooking plates specified in U.S. Pat. No. 5,552,308, incorporated herein by reference in its entirety, comprising an iron cooking plate result in a much higher maximum temperature difference, $\Delta T_{max}$ for a first plate 52 having the same dimensions as the first plate 52 of the present disclosure used to derive curves 402, 404 and 406. As seen in FIG. 13 for prior art curve 408 corresponding to thermal model seen in FIG. 10 having a loading factor of 20%, the maximum temperature difference, $\Delta T_{max}$ is 56 C at a first plate 52 thickness of 0.187 inch or more than a 7× greater maximum temperature difference, $\Delta T_{max}$ than the present disclosure at the same first plate 52 thickness, t2. As seen in FIG. 13 for prior art curve 410 corresponding to thermal model seen in FIG. 11 having a loading factor of 40%, the maximum temperature difference, $\Delta T_{max}$ is 25 C at a first plate 52 thickness of 0.187 inch or more than a 3× greater maximum temperature difference, $\Delta T_{max}$ than the present disclosure at the same first plate 52 thickness, t2. Even at a first plate 52 thickness of 0.375 inch, the maximum temperature difference, $\Delta T_{max}$ for the prior art cooking plate at a loading factor of either 20% or 40% still exceeds the upper limit of 10 C for the isothermal cooking plate assembly 50.

Still referring to FIG. 13, Equation 8 was used to calculate the time required to heat up first plate 52 from room temperature (e.g., 25 C) to a typical cooking temperature (e.g., 150 C) for the case in which first plate 52 has length L13, width W26 and comprised of either aluminum or iron (i.e., prior art). As seen in FIG. 13, the times required to heat up first plate 52 having a length, L13 of 7.90 inch and width, W26 of 6.30 inch were calculated at first plate 52 thicknesses of 0.120, 0.187, 0.250 and 0.375 inch as seen at vertical lines 394, 396, 398 and 400, respectively, resulting in curves 412 and 414 for first plates 52 comprising aluminum and iron, respectively. First plate 52 thicknesses of 0.120, 0.187, 0.250 and 0.375 inch were selected for the calculation of the time required to heat up first plate 52 from room temperature since these thicknesses correspond to standard commercially available sheets of Aluminum Types 1100 and 6061 having lengths of 48 inches and widths of 24 inches. For the case of an aluminum first plate 52 of the present disclosure, the time required to heat up from 25 C to 150 C is seen in curve 412 of FIG. 13 based on a current input of 20 amps at 115 volts (e.g., standard line voltage). As seen in curve 412 of FIG. 13 for the case of a first plate 52 of the present disclosure comprised of aluminum and having a thickness of 0.187 inch, the time required to heat up first plate 52 from 25 C to 150 C is about 20 seconds. For the case of a first plate 52 of the present disclosure comprised of aluminum and having thickness of 0.250 inch, the time required to heat up first plate 52 from 25 C to 150 C is about 27 seconds. In contrast, as seen in curve 414 of FIG. 13 for the case of a first plate 52 of the prior art comprised of iron and having thickness of 0.187 inch, the time required to heat up first plate 52 from 25 C to 150 C is about 35 seconds and for a thickness of 0.250 inch, the time required to heat up first plate 52 from 25 C to 150 C is about 46 seconds.

A preferred arrangement for the removable attachment of first electrical lead wire 158 and second electrical lead wire 160 to first electrical contact pad 62 and second electrical contact pad 64, respectively, is seen in FIG. 5. The proximal ends of first electrical lead wire 158 and second electrical lead wire 160 are electrically connected, by way of example, to solid-state relay at controller 20. By way of example, the distal ends of first electrical lead wire 158 and second electrical lead wire 160 are terminated at first washer-type electrical contact 150 and at second washer-type electrical contact 152, respectively. First electrical contact pad 62 and second electrical contact pad 64 traverse across thermally insulative second plate 30 of low thermal conductivity material through first slot 57 and second slot 58, respectively. By way of example, first rectangular slot 57 and second rectangular slot 58 have thickness t10 and length L7 and extend through full thickness of second plate 30 of low thermal conductivity material. Mechanical fastening screws 154, 156 traverse first washer-type electrical contact 150 and second washer-type electrical contact 152 respectively, as well as holes 66, 68 in first electrical contact pad 62 and second electrical contact pad 64, respectively. Mechanical fastening screws 154, 156 are received in threaded holes 162 and 164, respectively. Belleville disc springs 166, 168 of height H3 and thickness t18, preferably a stack of at least two, preferably four and arranged to maximize deflection distance, are selected having an outside diameter and inside diameter matched to outside diameter, D9 of mechanical fastening screws 154, 156 and outside diameter of washer-type electrical contacts 150, 152. By way of example, stainless steel Type 302 Belleville disc springs 166, 168 are available from McMaster-Carr Supply Company Supply (Cleveland, Ohio).

The application of torque to mechanical fastening screws 154, 156 induces compression of Belleville disc springs 166, 168, thereby achieving sufficient mechanical contact pressure to minimize electrical contact resistance between first washer-type electrical contact 150 and second washer-type electrical contact 152 and first electrical contact pad 62 and second electrical contact pad 64, respectively.

Still referring to FIG. 5, distal end of temperature sensor 38 is seen inserted through full-thickness hole 48 of diameter D7 in second plate 30. The proximal end of temperature sensor 38 is connected to controller 20 for controlling temperature of first plate 52 (not shown).

A detailed cross section of flexible heater circuit assembly 130 affixed to bottom surface of first plate 52 of high thermal conductivity material is seen in FIG. 6 as referenced in FIG. 5. As seen in greater detail in FIGS. 6 and 6A, the flexible heater circuit assembly 130 is a composite 60 comprising a thin high-temperature adhesive layer 140, electrically insulative substrate 142 and resistive heating element leg 144. Referring to FIG. 6, serpentine resistive heating element leg 144 is disposed on electrically insulative substrate 142 and bonded thereto as described above. By way of example, serpentine resistive heating element leg 144 is a low temperature coefficient of resistance metal alloy, such as Constantan having thickness t14 and electrically insulative substrate 142 is polyimide film of thickness, t13. As seen in FIG. 6, electrically insulative substrate 142 is adhesively bonded to first plate 52 of high thermal conductivity material using high-temperature adhesive, 140 capable of operating at temperatures of up to 230 C and having thickness, t12. By way of example, high-temperature adhesive 140 may be screen-printed on to first plate 52 of high thermal conductivity material using EPO-TEK® 930-4 available from Epoxy Technology, Inc. (Billerca, Mass.) followed by placement of flexible substrate heater circuit assembly 130 in thermal communication with substantially the entire surface of the back surface of first plate 52 of high thermal conductivity material as seen in FIG. 5. Alternatively, high-temperature adhesive 140 may be screen-printed on to first plate 52 of high thermal conductivity material using Thermasil™ adhesive available from American Standard Circuits, Inc. (West Chicago, Ill.).

As an alternative to the physical arrangement of the serpentine resistive heating element leg 144, electrically insulative substrate 142 and high-temperature adhesive 140 seen in FIG. 6, the thermal impedance between the serpentine resistive heating element leg 144 and the first plate 52 of high thermal conductivity material may be reduced by positioning a high-temperature, electrically insulative adhesive 140 between the serpentine resistive heating element leg 144 and the first plate 52 of high thermal conductivity material without an intervening layer of electrically insulative substrate 142. The high-temperature, electrically insulative adhesive 140 is available from Epoxy Technology, Inc. (Billerca, Mass.). This alternative arrangement requires the use of an electrically insulative high-temperature adhesive 140 to prevent electrical communication and dielectric breakdown between the serpentine resistive heating element leg 144 and first plate 52.

Figures 7, 7A:
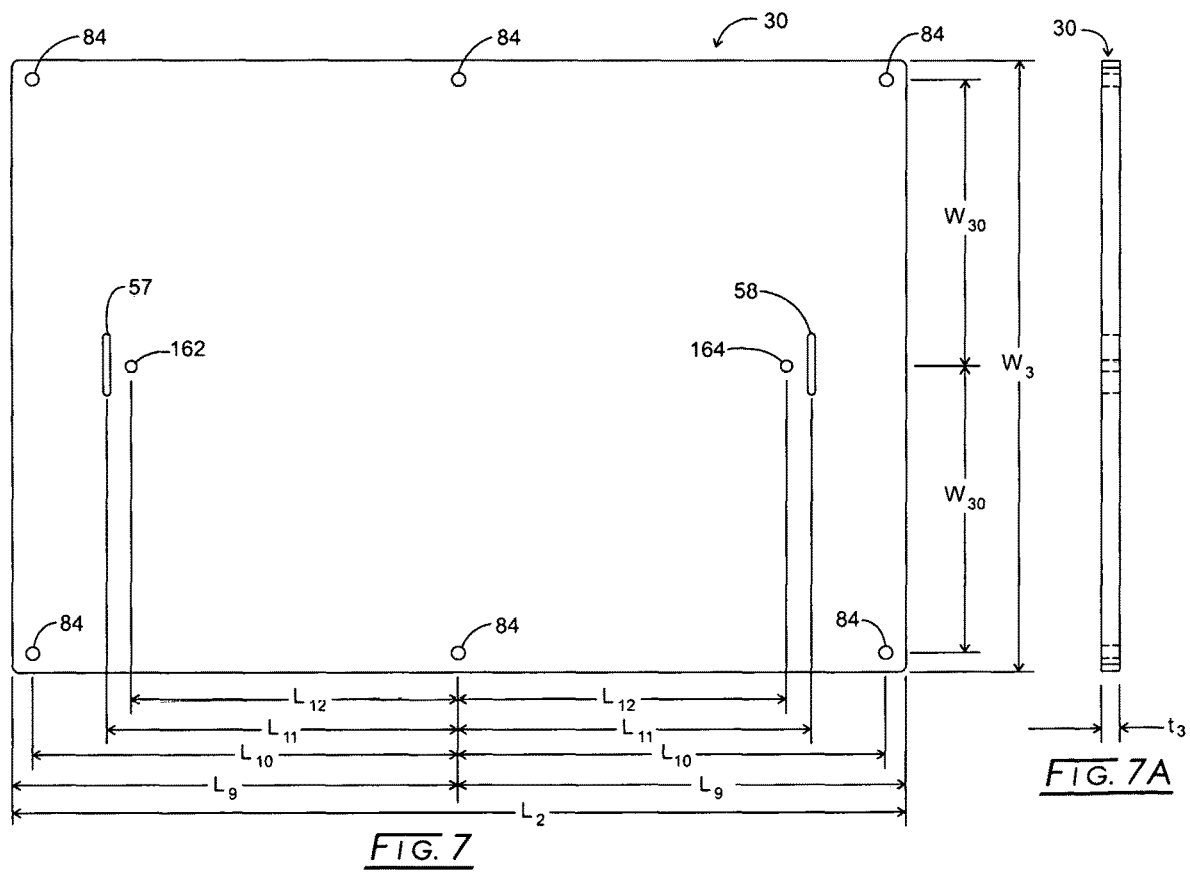
FIG. 7 is a bottom view of second plate of low thermal conductivity material showing rectangular slots for passage of electrical contact lead tabs from flexible substrate heater circuit assembly and threaded holes for mechanical attachment of leads between controller and electrical contact lead tabs.
FIG. 7A is a side view of the second plate in FIG. 7.

Referring next to FIG. 7, second plate 30 of low thermal conductivity material is seen in both top view and side view providing a specification for the dimensions of the second plate 30 of low thermal conductivity material as well as the location of six holes 84 for passage of mechanical fastening screws 82 that secure first plate 52 of high thermal conductivity material to second plate 30 of low thermal conductivity material. Also, the locations of first threaded hole 162 and second threaded hole 164 seen in FIG. 5 are shown relative to the position of first slot 57 and second slot 58, respectively.

The range of dimensions for the griddle system 10 and its components, as seen in FIGS. 1, 1B, 2, 3A, 3B, 4, 5, 6, 7, 9, 9A, 10, 11 and 12 are summarized below in units of inches:

L1 = 9.0 to 12.0
L2 = 7.2 to 8.4
L3 = 7.1 to 8.3
L4 = 7.0 to 8.3
L5 = 4.5 to 6.7
L6 = 0.75 to 1.5
L7 = 0.32 to 0.82
L9 = 3.6 to 4.2
L10 = 3.4 to 4.0
L11 = 2.6 to 3.2
L12 = 2.0 to 2.6
L13 = 7.9
L14 = 0.394
L15 = 1.8 to 3.6
W1 = 8 to 54
W2 = 6.3
W3 = 6.0 to 7.2
W4 = 6.1 to 7.1
W5 = 2.0 to 4.0
W6 = 0.05 to 0.25
W7 = 0.01 to 0.03
W8 = 0.003 to 0.100
W9 = 0.003 to 0.100
W10 = 0.01 to 0.03
W11 = 0.01 to 0.04
W12 = 0.05 to 0.25
W13 = 0.05 to 0.25
W14 = 0.01 to 0.04
W15 = 0.30 to 0.80
W16 = 0.05 to 0.20
W17 = 0.05 to 0.25
W18 = 0.02 to 0.25
W19 = 0.40 to 1.00
W20 = 0.003 to 0.100
W21 = 0.003 to 0.100
W22 = 0.02 to 0.25
W23 = 3.15
W24 = 0.4
W25 = 0.8
W26 = 6.3
W27 = 1.57
W28 = 4.72

-continued

```
W29 = 0.394
W30 = 2.9 TO 3.4
W31 = 2.37
W32 = 0.79
H1 = 4.0 TO 10.0
H2 = 2.0 TO 6.0
H3 = 0.012 to 0.030
D2 = 0.10 to 0.20
D3 = 0.10 to 0.20
D4 = 0.10 to 0.20
D5 = 0.10 to 0.20
D6 = 0.10 to 0.25
D7 = 0.37 to 0.50
D8 = 0.11 to 0.22
D9 = 0.10 to 0.20
D10 = 0.110 to 0.220
D11 = 0.120 to 0.250
D12 = 0.120 to 0.250
D13 = 0.110 to 0.220
t1 = 0.02 to 0.10
t2 = 0.150 to 0.250
t3 = 0.25 to 0.75
t4 = 0.25 to 1.00
t5 = 0.08 to 0.20
t6 = 0.05 to 0.20
t7 = 0.05 to 0.20
t8 = 0.05 to 0.20
t9 = 0.025 to 0.125
t10 = 0.02 to 0.08
t11 = 0.0005 to 0.005
t12 = 0.001 to 0.010
t13 = 0.0005 to 0.002
t14 = 0.0003 to 0.003
t15 = 0.0005 to 0.003
t16 = 0.000008 to 0.000020
t17 = 0.04 to 0.15
t18 = 0.007 to 0.015
t19 = 0.04 to 0.19
t20 = 0.45 to 0.70
```

Figure 8C:
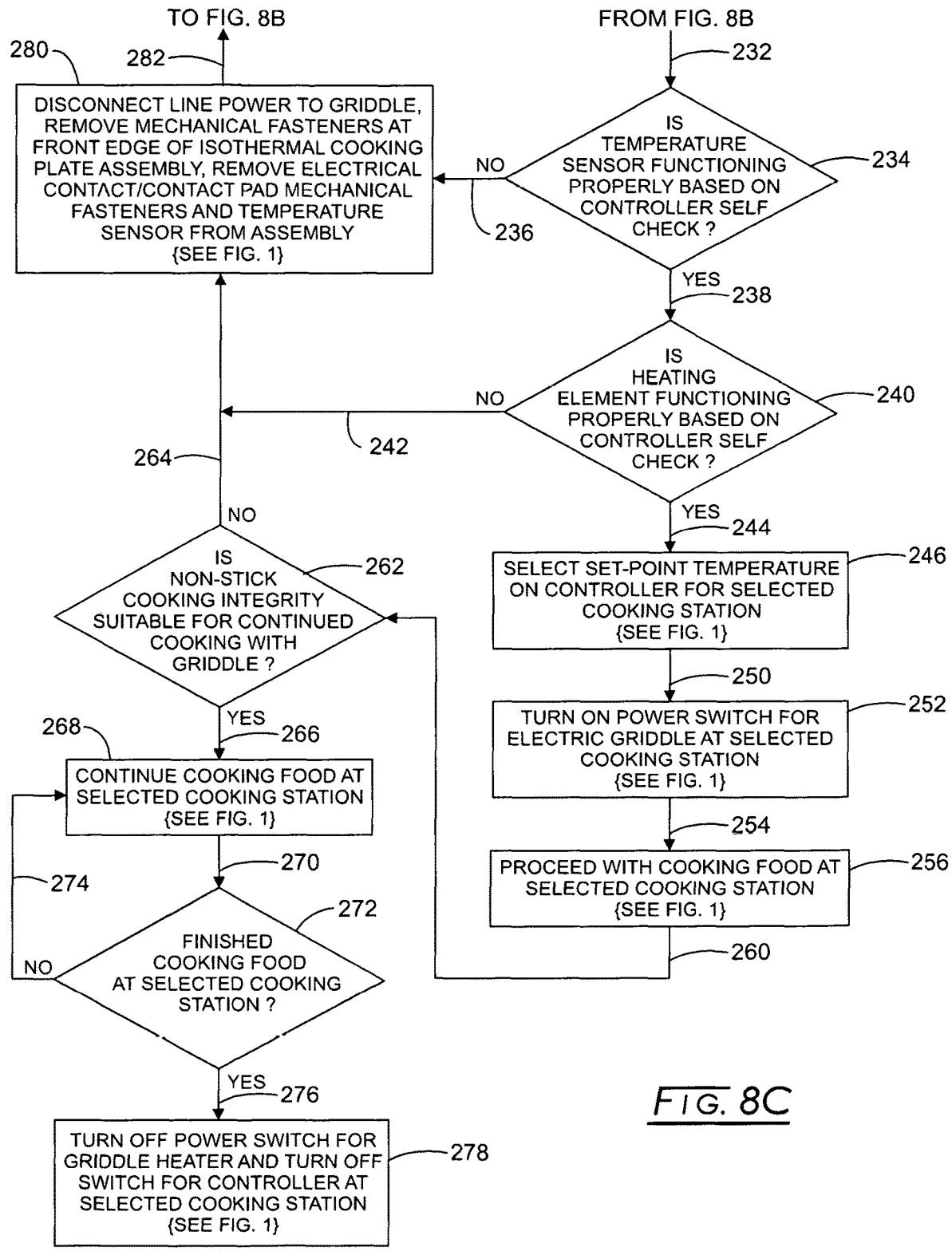

The manufacturing process for constructing the preferred embodiment disclosed in connection with FIGS. 1, 1B, 3A, 3B, and 4-7 as well as the method of use of griddle system 10 are set forth in the flow chart represented in FIGS. 8A-8C. Those figures should be considered as labeled thereon. Looking to FIG. 8A, the procedure commences with adhering metal or metal alloy layer of thickness, t14 to flexible electrically insulative film substrate of thickness, t13 as described at block 170 and arrow 172. Those two materials are a low temperature coefficient of resistance metal alloy (e.g., Constantan) and polyimide electrically resistive film substrate. An advantage of the use of a low temperature coefficient of resistance metal alloy is that power delivery to the resistive heater from a line voltage source of fixed voltage level (e.g., 115 volt line voltage sources widely available in the U.S. and 230 volt line voltage sources widely available in most of Europe and the United Kingdom) remains substantially constant as the resistive heating element temperature increases from ambient temperature to the user selected set-point temperature (e.g., 200 C). The process of adhering metal or metal alloy layer to flexible electrically insulative film substrate can be accomplished with the use of high temperature adhesive (e.g., polyimide adhesive). The metal or metal alloy adhered to flexible electrically insulative film substrate is next photo etched using photolithography to define the resistive heating element serpentine legs and current distribution leads as illustrated in FIGS. 3A, 3B, and 4 as identified in block 174 and arrow 172. Once the resistive heating element serpentine legs and current distribution leads have been defined, the lead (also referred to a bus) portions are selectively plated with copper to minimize resistance in the leads using a copper plating thickness, t16 as identified in block 178 and arrow 176. In order to minimize oxidation of copper plating leads as well as minimize electrical contact resistance between the lead tab portion and the abutting washer-type electrical contact as seen in FIG. 5, copper-plated leads are over plated with a gold layer of thickness, t17 as identified at block 182 and arrow 180.

Referring now to FIGS. 7 and 8A, in preparation for the fabrication of the isothermal cooking plate assembly 50, the thermally insulative second plate 30 may be injection molded or cast with [a] through holes for use with mechanical fastening screws for attachment thermally insulative second plate 30 to first plate and [b] slots for passage of electrical contact tabs from heater to bottom surface of thermally insulative second plate 30 to enable electrical contact with washer-type electrical lead contact as seen in FIG. 5 and identified in block 183 and arrow 185. By way of example, injection-molding resins may advantageously include polyetherimide or polyphenylene sulfide from sources identified in a preceding section of this specification. The two holes adjacent to the two slots may advantageously be sized to receive press-in, flanged-head threaded inserts thereby eliminating the need for post-injection molding machining processes. By way of example, press-in, flanged-head threaded inserts are manufactured by Penn Engineering and available through D. B. Roberts Company (Highland Heights, Ohio). The fabrication of the thermally insulative second plate 30 using only injection molding processes provides the advantage of minimizing the cost of this component and, thereby, minimizing the overall cost of the replaceable isothermal cooking plate assembly 50. The isothermal cooking plate assembly 50 is attached to griddle using only mechanical fasteners to enable the rapid and convenient replacement of the isothermal cooking plate assembly 50 in the field, the rapid and convenient replacement being performed without the need for replacement of temperature sensor 39, controller 20, or structural components of griddle system 10 including front panel 12, left side panel 14, right side panel 16, or rear panel 18.

The first plate 52 is machined to match the dimensions of the thermally insulative second plate 30 with threaded holes located to match through holes in the thermally insulative second plate 30 as identified in block 186 and arrow 188. By way of example, the first plate may be machined from aluminum Type 1100 or aluminum Type 6061. A non-stick coating may optionally be applied to top surface and side edges of first plate as identified in block 190 and 192. The use of a non-stick coating on the cooking surface serves to minimize adherence of food 53 (not shown) to the first plate surface during cooking process as well as minimize the need for additional cooking oils and fats during the cooking process. Alternative high-temperature non-stick coatings include polytetrafluoroethylene as well as ceramic non-stick coatings. A preferred embodiment of the griddle system of the present disclosure incorporates the use of a non-stick coating. A particular advantage of the griddle system of the present disclosure is the ability to replace the relatively low-cost isothermal cooking plate assembly 50 at such time as the non-stick coating release characteristic degrades following extended cooking use or as a result of an electrical failure within the resistive heating element, the rapid and convenient replacement being performed without the need for replacement of temperature sensor 39, controller 20, or structural components of griddle system 10 including front panel 12, left side panel 14, right side panel 16, or rear panel 18.

Still referring to FIG. 8A, a high-temperature adhesive layer 140 is next applied to back surface of first plate in preparation for bonding the resistive heating element/electrically insulative film substrate subassembly to the first plate as seen in FIG. 6 and identified in block 194 and arrow 196. The next step involves the bonding of the resistive heating element/electrically insulative film substrate subassembly to the first plate as identified in block 198 and arrow 200. One possible arrangement of the resistive heating element, electrically insulative film substrate and high-temperature adhesive is seen in FIG. 6 wherein the electrically insulative film substrate is disposed between the resistive heating element and the adhesive layer 140. An alternative arrangement may advantageously position the resistive heating element directly in contact with an electrically insulative, high-temperature adhesive and thereby reduce the thermal impedance between the resistive heating element and the first plate since heat conduction through the electrically insulative film substrate is avoided. As a consequence, the time required to increase the temperature of the first plate from ambient temperature to the user selected set-point temperature is reduced. Accordingly, the waiting time from the start of energizing the heater to the time when cooking can commence is likewise reduced. By way of example, high-temperature, electrically insulative adhesives include EPO-TEK® 930-4 available from Epoxy Technologies (Billerica, Mass.) and THERMASIL® available from American Standard Circuits (West Chicago, Ill.).

Figure 6A:
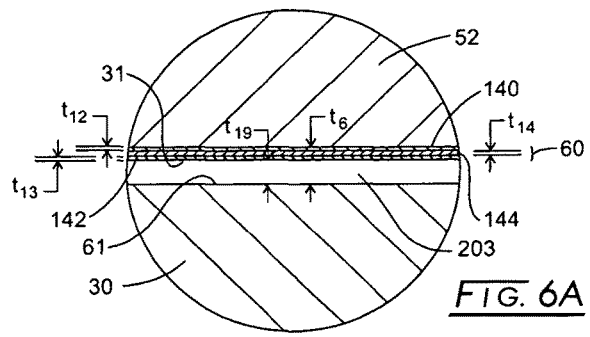
FIG. 6A is an enlarged partial view of first plate of high thermal conductivity material and flexible substrate heater circuit assembly showing the direct attachment of heating element side of the flexible substrate heater circuit assembly to the first plate using high-temperature thermally insulative and thermally conductive adhesive.

Referring now to FIG. 8B, the first plate/heater subassembly completed in block 198 is next mechanically attached to thermally insulative second plate 30 with an intervening gasket (e.g., silicone rubber) of thickness t6 around the perimeter of the interface between the first plate and the thermally insulative second plate 30 as seen in FIG. 2 and identified in block 202 and arrow 204. The intervening perimeter gasket of thickness t6 results in an air gap 203 between the first plate and the thermally insulative second plate 30 as seen in FIGS. 5, 6 and 6A. This air gap 203 of thickness t6, combined with the low thermal conductivity of the plastic material selected for the thermally insulative second plate 30, serves to minimize heat losses from the back surface of the first plate (i.e., the side opposite the cooking surface) and thereby increase the overall efficiency of the griddle system during use. In addition, based on a preferred embodiment of the present disclosure, reducing the elapsed time for heating up a griddle to cooking temperature level from 10 to 20 minutes to about 15 to 30 seconds for heating up a griddle to cooking temperature level enables the griddle system of the present disclosure to be turned off between uses, thereby eliminating power consumption during idle periods during which no cooking is being performed. The combination of [a] the reduced heat and associated power losses during the cooking period through the incorporation of a thermally insulative second plate 30 and thermally insulative air gap 203 in the griddle system and [b] the capability to turn off electrical power to the first plate between uses enables the achievement of a high efficiency level since minimal heating power is required and only during the actual cooking period. The cost for materials and labor to manufacture and test the isothermal cooking plate assembly 50, as seen in FIG. 5 and specified in the manufacturing steps seen in blocks 170 through 202 of FIG. 8A, is estimated to be less than $100.

Still referring to FIG. 8B, griddle enclosure is assembled as identified in block 208 and arrow 210 and includes [a] support members for isothermal cooking plate assembly 50 located along the interior of front and rear griddle enclosure panels, [b] stabilization pins located on rear panel of griddle enclosure, [c] one or more controller/solid state relay unit and associated power switch corresponding to the number of cooking stations and [d] one or more heater power switches corresponding to the number of cooking stations as seen in FIGS. 1 and 2. The next assembly step involves the mechanical attachment of the distal ends of first and second electrical leads to first and second electrical contact pads as seen in FIG. 5 and as identified at block 206 and arrow 212. Next, the proximal ends of first and second electrical leads are attached to each controller/solid state relay unit as identified at block 214 and arrow 216. Next, mechanically attach washer-type thermocouple temperature sensor 39 to first plate 52 as seen in FIG. 5 and attach proximal ends of temperature sensor leads to controller as identified at block 218 and arrow 220. Finally, align stabilization pin receptacle holes in thermally insulative second plate 30 with stabilization pins affixed to rear panel of griddle enclosure and translate thermally insulative second plate 30 towards rear panel of griddle enclosure so that stabilization pins enter and engage stabilization pin receptacle holes. Next, align holes at front end of thermally insulative second plate 30 with threaded holes in thermally insulative mounting support and complete attachment of thermally insulative second plate 30 using mechanical fasteners as seen in FIG. 2 and as identified in block 222 and arrow 224. Having completed this last step, the assembly of the griddle system is complete as seen in FIG. 1 and as identified in block 226 and arrow 252.

Referring now to FIG. 8C, the next sequence of steps refers to operation of the griddle system for the purpose of cooking food 53. The first step in the use of a selected station of the griddle system is to turn on the controller using the controller on/off switch as identified at block 230. As represented at arrow 232 and block 234, an electrical test is automatically performed by the controller to determine if the temperature sensor is functioning properly. In the event the temperature sensor is not functioning properly, a visual cue will be displayed and it will be necessary to detach the isothermal cooking plate assembly 50 from the front and rear supports within the griddle assembly so that temperature sensor can be replaced as identified in prior block 218 and arrow 220. Following replacement of the temperature sensor, the isothermal cooking plate assembly 50 can be reattached to the front and rear panels of griddle system as identified in prior block 222 and arrow 224. Still referring now to FIG. 8C, the next step after temperature sensor replacement is to turn on the controller using the controller on/off switch as identified at block 230. As represented at arrow 232 and block 234, an electrical test is again automatically performed by controller to determine if the new temperature sensor is functioning properly. In the event the new temperature sensor or, on the other hand, the original temperature sensor is functioning properly, the operation of the griddle systems proceeds to the next step as identified by arrow 238 and block 240. In block 240, an electrical test is automatically performed by controller to determine if the resistive heating element resistance is within a predetermined acceptable range. If the resistive heating element resistance is not within a predetermined acceptable range, a visual cue will be displayed at it will be necessary to detach the isothermal cooking plate assembly 50 from the front and rear supports within the griddle assembly so that a new isothermal cooking plate assembly 50 replaces the defective isothermal cooking plate assembly 50 by returning to block 206 following path indicated by arrow 242 and repeating sequential steps as represented in blocks 206, 214, 218 and 222. On the other hand, if resistive heating element resistance is within a predetermined acceptable range, then the operation of the griddle system proceeds to the next step as identified by block 240 and arrow 244.

Still referring to FIG. 8C, the next step in the operation of the griddle system is the selection of the set-point temperature by the user and display of the set-point temperature by the controller as illustrated in FIG. 1 and as represented by block 246 and arrow 250. Next, upon the intended start of cooking at selected station of griddle system, operator turns on power to heater at selected station and waits about 15 to 30 seconds for first plate 52 to heat up to selected set-point temperature as indicated by display on controller seen in FIG. 1 and as identified by block 252 of high thermal conductivity material and arrow 254. Once the first plate temperature reaches the user selected set-point temperature, cooking commences as identified in block 256 and 260. During or after the period of cooking, the user visually inspects the non-stick coating, if used, on the surface of the first plate as identified by block 262. If the integrity of the non-stick coating is unsuitable for continued cooking then it will be necessary to detach the isothermal cooking plate assembly 50 from the front and rear supports within the griddle assembly so that a new isothermal cooking plate assembly 50 replaces the defective isothermal cooking plate assembly 50 by returning to block 206 following path indicated by arrow 242 and repeating sequential steps as represented in blocks 206, 214, 218 and 222. On the other hand, if the integrity of the non-stick coating is suitable for continued cooking, then cooking may continue as seen in arrow 266 leading to block 268. The user next decides if cooking at selected station of griddle system has been completed as identified at block 272. If cooking has not been completed, continue cooking as identified by arrow 274 and block 268. On the other hand, if cooking has been completed, turn off power switch to griddle heater and power switch to controller as seen in FIG. 1 and as identified at block 278.

While the apparatus, method, and system have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. All citations referred herein are expressly incorporated herein by reference.

I claim:

1. An array of two or more of the isothermal laminate cooking plate assemblies wherein each isothermal cooking plate assembly is independently controllable and mechanically attached within a griddle enclosure and comprises:
   (a) a first plate of high thermal conductivity material having a back surface and an oppositely disposed top food cooking surface and separated by a gap along the boundary between each adjacent isothermal laminate cooking plate assembly to provide thermal isolation for operation of each isothermal cooking plate assembly at a different set-point temperature, the first plate comprising aluminum whose thickness is substantially uniform and has:
      (i) a thermal conductivity of at least 1.67 watts/cm-C;
      (ii) a surface area of not greater than 54 square inches;
      (iii) a length-to-width aspect ratio that does not exceed about 1.5; and
      (iv) a thickness in the range of 0.187 lto 0.250 inches;
   (b) a second plate of low thermal conductivity material and having a second plate front side, and being mechanically spaced apart from and attached to each first plate of high thermal conductivity material;
   (c) a heater circuit assembly disposed on and substantially covering each first plate back surface and located between the first plate and the second plate;
   (d) a temperature sensor in thermal contact with the first plate;
   (e) a controller in electrical connection with each heater circuit assembly through first and second electrical leads for controlling the temperature of each first plate top food cooking surface,
   each first plate and heater circuit assembly forming a first composite mechanically attached to the griddle enclosure, wherein each composite is replaceable in the field by mechanically disconnecting the first and second electrical leads from the electrically conductive lead and contact pattern and by mechanically disconnecting the temperature sensor from the first plate and mechanically disconnecting the first composite from the griddle enclosure, wherein:
      (i) the maximum temperature difference between an operator selected set point temperature and any temperature of the first plate top food cooking surface in contact with food is less than about 10 C for set point temperatures up to about 230 C and a loading factor of up to 60%, and
      (ii) the rate of heat-up of the first plate from about 25 C to about 150 C for any area of the first plate food cooking surface is less than about 30 seconds using an applied voltage of 115 volts and maximum current of 20 amps for the single heating circuit assembly substantially covering the first plate back surface.

2. The array of two or more isothermal cooking plate assemblies assembly of claim 1, wherein the first plate comprises Aluminum Type 1100 or Aluminum Type 6061.

3. The array of two or more isothermal cooking plate assemblies assembly of claim 1, wherein the first plate comprises a laminate comprising a bottom metal cladding layer and top food cooking surface metal cladding layer, the cladding layers formed from the same material and having a cladding layer thickness in the range from 0.002 inch to 0.010 inch.

4. The array of two or more isothermal cooking plate assemblies assembly of claim 3, wherein the cladding material comprises austenitic stainless steel.

5. The array of two or more isothermal cooking plate assemblies assembly of claim 1, wherein a second plate of low thermal conductivity material is mechanically attached to the back surface of the first plate and oppositely disposed to the top food cooking surface.

6. The array of two or more isothermal cooking plate assemblies assembly of claim 5, wherein an air layer is present between the second plate and the one or more screen printed and cured or fired heater circuit assembly disposed on the first plate back surface.

7. The array of two or more isothermal cooking plate assemblies assembly of claim 1, wherein a layer of non-stick material is disposed on the top food cooking surface of the first plate.

8. The array of two or more isothermal cooking plate assemblies assembly of claim 1, wherein the controller includes a temperature-sensor based feedback control.

9. The array of two or more isothermal cooking plate assemblies assembly of claim 1, wherein the electrically resistive heating element contains a metal alloy having a temperature coefficient electrical resistance of less than 500 parts per million per degree C.

10. The array of two or more isothermal cooking plate assemblies assembly of claim 1, wherein the isothermal cooking plate assembly is attached to griddle enclosure using only mechanical fasteners to enable field replaceable isothermal cooking plate assembly.

11. The array of two or more isothermal cooking plate assemblies assembly of claim 1, wherein the electrically resistive heating element is a metal alloy having a temperature coefficient electrical resistance of less than 500 parts per million per degree C.

12. The array of two or more isothermal cooking plate assemblies assembly of claim 1, wherein the electrically resistive heater circuit material is a copper-nickel alloy.

13. The array of two or more isothermal cooking plate assemblies of claim 1, wherein said each heater circuit assembly is a flexible polyimide substrate heater circuit assembly comprising:
   an electrically resistive heater circuit accessed by exposed contact tab terminals, wherein both the heater circuit and contact terminals are disposed on a surface of an electrically insulative polyimide substrate;
   (ii) (x) an electrically insulative and thermally conductive adhesive layer disposed on the first plate back surface if the resistive heating element is bonded directly to the first plate back surface, or (y) a thermally conductive adhesive layer disposed on the first plate back surface if the electrically resistive heating element has an electrically insulative side and if the resistive heating element is bonded directly to the electrically insulative side of the flexible circuit assembly; and
   (iii) an electrically conductive lead and contact pad pattern in communication with the electrically resistive heater circuit exposed contact tab terminals;.

14. The array of two or more isothermal cooking plate assemblies of claim 1, wherein the electrically resistive heating element contains a metal alloy having a temperature coefficient electrical resistance of less than 500 parts per million per degree C.

15. The array of two or more isothermal cooking plate assemblies of claim 14, wherein the metal alloy is a copper-nickel alloy.

16. The array of two or more isothermal cooking plate assemblies of claim 1, wherein an air gap creates the second plate front side being spaced apart from each first plate.

17. The array of two or more isothermal cooking plate assemblies of claim 1, wherein said each heater circuit assembly is a screen printed and fired heater circuit assembly disposed on and substantially covering each of the two or more first plate surfaces and comprising:
   (i) an electrically insulative layer disposed on the first plate back surface;
   (ii) an electrically resistive heating element disposed on the electrically insulative layer; and
   (iii) an electrically conductive lead and contact pad pattern in communication with the electrically resistive heating element and mechanically connected to first and second electrical leads.

18. The array of two or more isothermal cooking plate assemblies of claim 17, wherein the electrically resistive heating element contains a metal alloy having a temperature coefficient electrical resistance of less than 500 parts per million per degree C.

* * * * *